(12) United States Patent
Borawski et al.

(10) Patent No.: US 10,663,100 B2
(45) Date of Patent: May 26, 2020

(54) MECHANICAL BRANCH OUTLET

(71) Applicant: Anvil International, LLC, Exeter, NH (US)

(72) Inventors: Thomas Borawski, Coventry, RI (US); Joseph William Beagen, Jr., Providence, RI (US); Matthew W. McNamara, Portsmouth, RI (US); Stephen Eric Scott, North Kingstown, RI (US)

(73) Assignee: Anvil International, LLC, Exeter, NH (US)

( * ) Notice: Subject to any disclaimer, the term of this patent is extended or adjusted under 35 U.S.C. 154(b) by 0 days.

(21) Appl. No.: 16/384,314

(22) Filed: Apr. 15, 2019

(65) Prior Publication Data

US 2019/0242514 A1 Aug. 8, 2019

Related U.S. Application Data

(62) Division of application No. 14/926,781, filed on Oct. 29, 2015, now Pat. No. 10,309,568.

(51) Int. Cl.
| | |
|---|---|
| *F16L 17/02* | (2006.01) |
| *F16L 41/02* | (2006.01) |
| *F16L 41/12* | (2006.01) |
| *F16L 25/06* | (2006.01) |
| *F16L 41/06* | (2006.01) |

(52) U.S. Cl.
CPC ............ *F16L 41/021* (2013.01); *F16L 17/02* (2013.01); *F16L 25/06* (2013.01); *F16L 41/06* (2013.01); *F16L 41/12* (2013.01)

(58) Field of Classification Search
CPC .......... F16L 41/08; F16L 41/088; F16L 41/12
USPC ......................... 285/197, 198, 199, 204, 188
See application file for complete search history.

(56) References Cited

U.S. PATENT DOCUMENTS

| 45,964 | A |   | 1/1865 | Ball | |
|---|---|---|---|---|---|
| 2,239,651 | A | * | 4/1941 | McMurray | .............. F16L 41/12 285/197 |
| 2,946,518 | A | * | 7/1960 | Wahlin | ....................... B05B 1/14 239/266 |
| 3,132,881 | A | * | 5/1964 | Corey | ..................... F16L 41/12 285/197 |
| 3,218,093 | A | * | 11/1965 | Carlson | ................... F16L 41/12 285/197 |

(Continued)

FOREIGN PATENT DOCUMENTS

| EP | 0793048 | 9/1997 |
|---|---|---|
| GB | 2097501 | 11/1982 |

OTHER PUBLICATIONS

Borawski, Thomas; Applicant-Initiated Interview Summary for U.S. Appl. No. 14/926,781, filed Oct. 29, 2015, dated Nov. 6, 2018, 5 pgs.

(Continued)

*Primary Examiner* — David Bochna
*Assistant Examiner* — James A Linford
(74) *Attorney, Agent, or Firm* — Taylor English Duma LLP

(57) ABSTRACT

A mechanical branch outlet including: a housing having an outer surface and an inner surface and defining an outlet bore extending between the outer surface and the inner surface; and an insert having a first end and a second end, the outlet bore of the housing sized to receive the second end of the insert and retain the first end of the insert.

19 Claims, 14 Drawing Sheets

(56) References Cited

U.S. PATENT DOCUMENTS

| | | | |
|---|---|---|---|
| 3,622,184 A * | 11/1971 | Deasy | F16L 41/06 285/197 |
| 3,999,785 A | 12/1976 | Blakely | |
| 6,412,824 B2 | 7/2002 | Kunsman | |
| 10,309,568 B2 | 6/2019 | Borawski et al. | |
| 2017/0122474 A1 | 5/2017 | Borawski | |
| 2019/0242513 A1 | 8/2019 | Borawski et al. | |

OTHER PUBLICATIONS

Borawski, Thomas; Non-Final Office Action for U.S. Appl. No. 14/926,781, filed Oct. 29, 2015, dated Mar. 15, 2018, 21 pgs.

Borawski, Thomas; Notice of Allowance for U.S. Appl. No. 14/926,781, filed Oct. 29, 2015, dated Jan. 17, 2019, 10 pgs.

Borawski, Thomas; Requirement for Restriction/Election for U.S. Appl. No. 14/926,781, filed Oct. 29, 2015, dated May 1, 2018.

Borawski, Thomas; U.S. Patent Application entitled: Mechanical Branch Outlet having U.S. Appl. No. 14/926,781, filed Oct. 29, 2015, 50 pgs.

Borawski, Thomas; Non-Final Office Action for U.S. Appl. No. 16/384,287, filed Apr. 15, 2019, dated Oct. 1, 2019, 17 pgs.

Borawski, Thomas; Requirement for Restriction/Election for U.S. Appl. No. 16/384,287, filed Jan. 15, 2019, dated Aug. 6, 2019, 9 pgs.

Anvil International; Article entitled "Threaded Mechanical Branch Tee", located at <http://www.anvilintl.com/ProductSearch/PrintProduct.aspx?lid=4150>, accessed on Aug. 19, 2015, 2 pgs.

Anvil International; Product Sheet for Gruvlock Clamp-T, publicly available prior to Oct. 29, 2015, 4 pgs.

Shurjoint; Product Sheet for Mechanical Cross, publicly available prior to Oct. 28, 2015, 5 pgs.

Shurjoint; Product Sheet for Model 723 Saddle-Let (Small Mechanical Tee), publicly available prior to Oct. 28, 2015, 3 pgs.

Shurjoint; Product Sheet for Model M22 Mechanical Tee, Grooved-End Outlet, publicly available prior to Oct. 28, 2015, 4 pgs.

Victaulic; Product Sheet for Hole Cut Piping System, copyright 2008; 4 pgs.

Victaulic; Product Sheet for Mechanical-T Bolted Branch Outlets, copyright 2012, 8 pgs.

Victaulic; Product Sheet for Copper Mechanical-T Bolted Branch Outlets and Cross Assemblies Style 622, copyright 2014, 5 pgs.

Viega, LLC; Brochure for Viega ProPress and MegaPress Systems, publicly available prior to Oct. 28, 2015, 20 pgs.

Borawski, Thomas; Notice of Allowance for U.S. Appl. No. 16/384,287, filed Apr. 15, 2019, dated Jan. 31, 2020, 15 pgs.

* cited by examiner

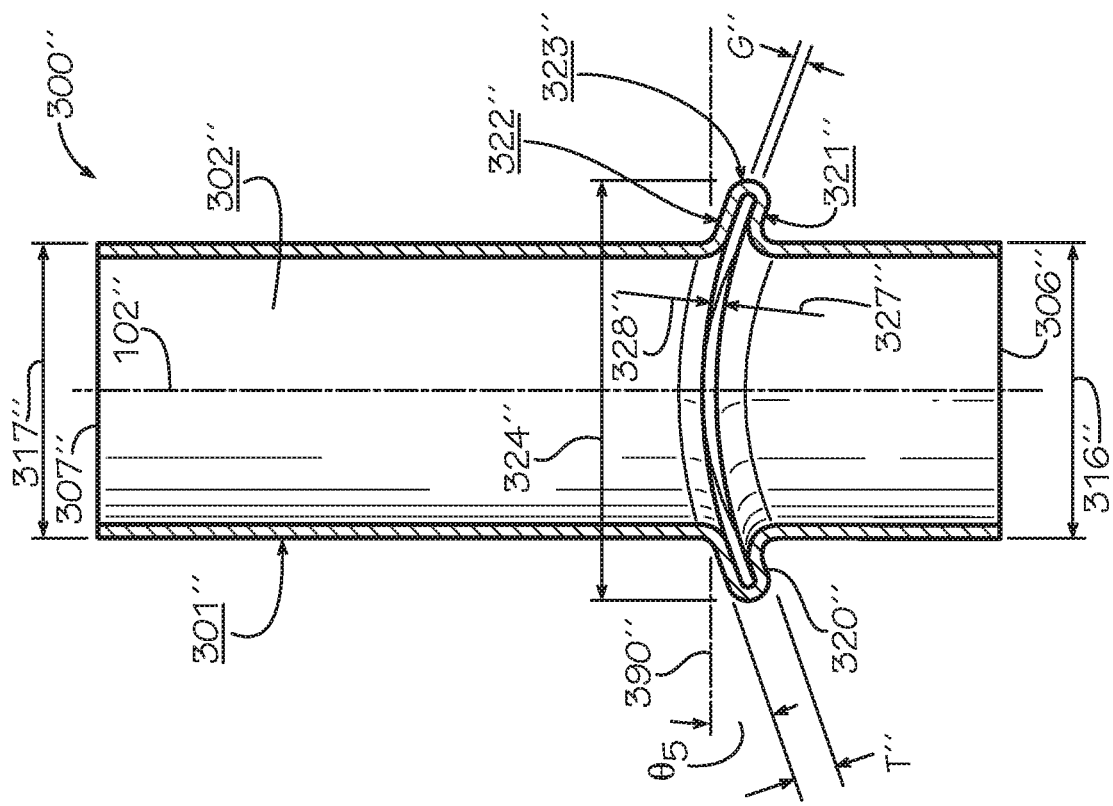
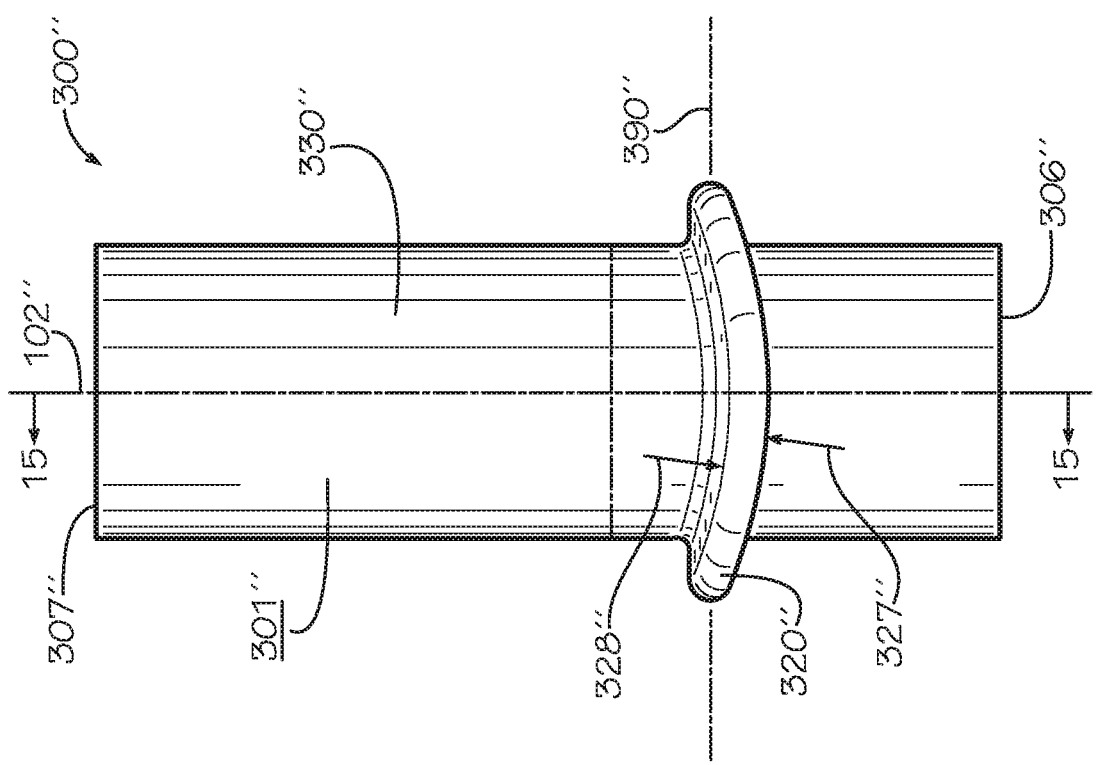

MECHANICAL BRANCH OUTLET

REFERENCE TO RELATED APPLICATIONS

This application is a divisional of U.S. application Ser. No. 14/926,781, filed Oct. 29, 2015, which is hereby specifically incorporated by reference herein in its entirety.

TECHNICAL FIELD

This disclosure relates to pipe fittings. More specifically, this disclosure relates to fittings for creating an outlet along a length of pipe.

BACKGROUND

In systems such as pipe systems that store or transport a fluid, various fittings may be utilized to connect one part of the pipe system to another part of the pipe system. When the fluid is water such as potable water (i.e., safe for drinking) or another fluid that is intended for human consumption such as a drinkable beverage, each component in the pipe system is typically manufactured from a material that does not contaminate the fluid. The fittings and connections used in such pipe systems including those used to create a branch outlet, however, typically incorporate sweating or threading operations that introduce installation cost and complexity.

SUMMARY

Disclosed is a mechanical branch outlet including: a housing having an outer surface and an inner surface and defining an outlet bore extending between the outer surface and the inner surface; and an insert having a first end and a second end, the outlet bore of the housing sized to receive the second end of the insert and retain the first end of the insert.

Also disclosed is a pipe system including: a mechanical branch outlet comprising: a housing; and an insert including a rim for retaining a first end of the insert inside the housing; and a pipe, the pipe defining a transverse bore in an outer wall of the pipe sized to receive the mechanical branch outlet, the mechanical branch outlet being assembled to the pipe.

Also disclosed is a method for assembling a mechanical branch outlet to a pipe including: assembling an insert to a pipe along an axis of a transverse opening in the pipe; and assembling a housing to the pipe, the mechanical branch outlet being isolated from a fluid path defined through the pipe and through the insert when the pipe system is in an assembled state.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 14 is a side view of an insert of the mechanical branch outlet of FIG. 11 taken along line 14-14 of FIG. 11.

FIG. 15 is a sectional view of the insert of FIG. 14 taken along line 15-15 of FIG. 14.

DETAILED DESCRIPTION

Disclosed is a mechanical branch outlet and associated methods, systems, devices, and various apparatus. The mechanical branch outlet includes a housing and an insert. It would be understood by one of skill in the art that the disclosed mechanical branch outlet is described in but a few exemplary embodiments among many. No particular terminology or description should be considered limiting on the disclosure or the scope of any claims issuing therefrom.

Figure 1:
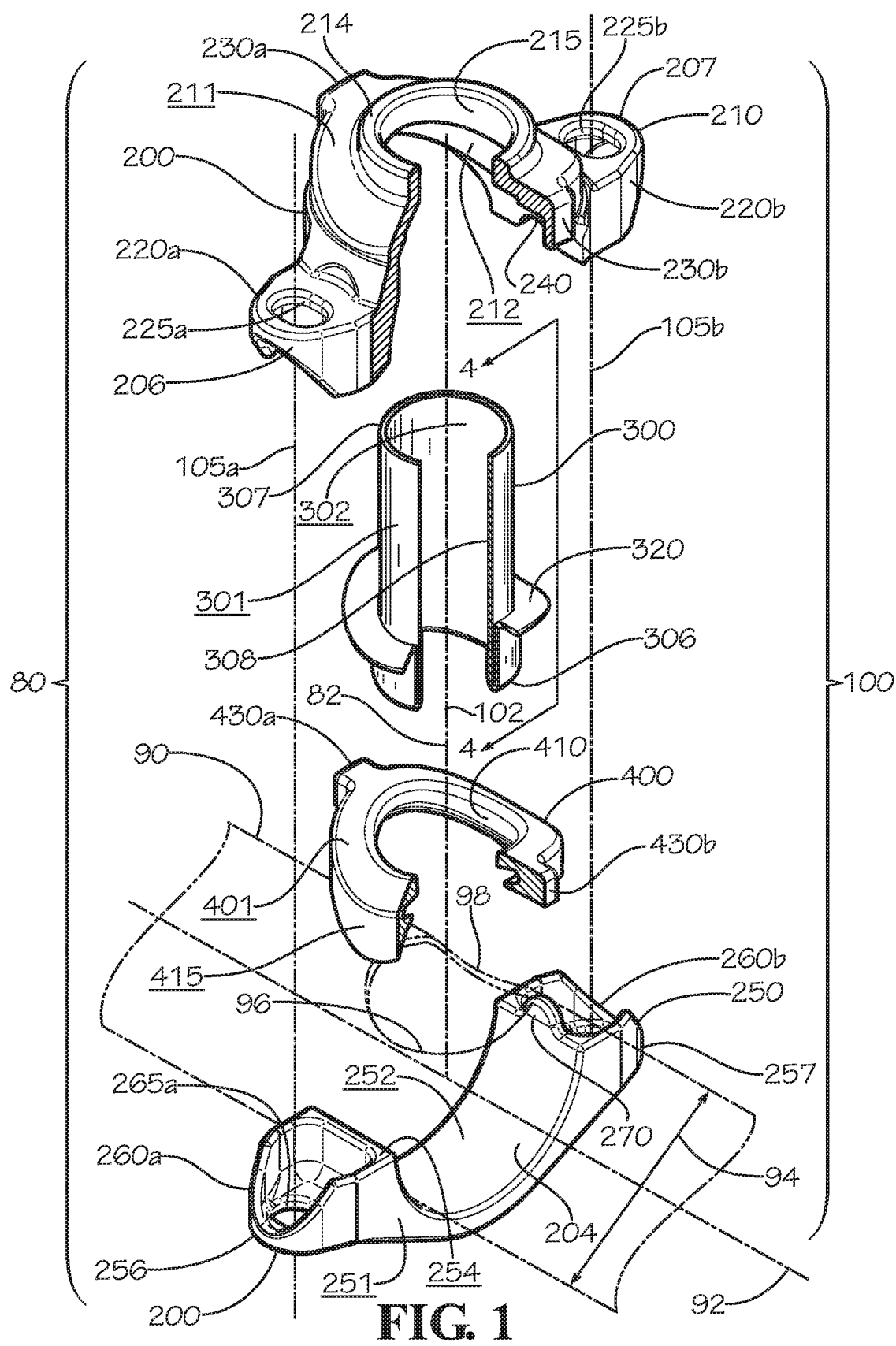
FIG. 1 is a partially sectioned perspective exploded view of a piping system including a mechanical branch outlet in accordance with one embodiment of the current disclosure.

FIG. 1 shows one embodiment of a mechanical branch outlet 100 for use in a pipe system 80. The pipe system 80 includes the mechanical branch outlet 100 and a pipe 90. The pipe 90—which can alternatively be described as a tube in various embodiments and is not limited to the relative diameter of the pipe 90 shown—defines a longitudinal axis 92, an outer diameter 94, and a transverse bore 96. In various embodiments, the transverse bore 96 of the pipe 90 defines a transverse bore axis 82 along which an axis 102 of the mechanical branch outlet 100 is aligned. The pipe 90 also defines an outer surface and includes an outer wall 98.

In various embodiments, the mechanical branch outlet 100 includes a housing 200, an insert 300, and a gasket 400. In various embodiments, the housing 200 includes an upper housing 210 and a lower housing 250. In various embodiments, fasteners such as a pair of fasteners 510a,b are positioned along a pair of axes 105a,b, respectively, to assemble and tighten the mechanical branch outlet 100 about the pipe 90. In various embodiments, such fasteners include, but are not limited to, a bolt and nut combination. In various embodiments, the bolt and nut combination and the lower housing 250 can be replaced with a U-bolt (not shown) with upward-facing threaded portions (not shown) aligned along axes 105a,b for tightening to the pipe 90 an upper housing and the remaining elements of a mechanical branch outlet like the mechanical branch outlet 100.

The upper housing 210 of the housing 200 defines an outer surface 211 and an inner surface 212. In various embodiments, the upper housing 210 defines an outlet bore 215 defined in a boss 214 and extending between the outer surface 211 and the inner surface 212. The outlet bore 215 aligns with the axis 102 during assembly of the mechanical branch outlet 100. In various embodiments, the outlet bore 215 of the upper housing is sized to receive a second end 307 of the insert 300. In various embodiments, the upper housing 210 includes fastener pads 220a,b, at a first end 206 and a second end 207, respectively. In various embodiments, the fasteners pads 220a,b define fastener openings 225a,b, which are slots in various embodiments and are cylindrical, oval, or elliptical in shape in various other embodiments, and a facing surface 224 (shown in FIG. 2). In various embodiments, the upper housing 210 has a semi-circular shape in a portion between the fastener pads 220a,b in order to match the curvature of the outer surface of the pipe 90. In various embodiments, a curvature of the inner surface 212 matches a curvature of the outer surface of the pipe 90. In various embodiments, the upper housing 210 includes ears 230a,b—which can alternatively be described as tabs in various embodiments—which define protruded portions of the outer surface 211 and indented portions of the inner surface 212.

Figure 2:
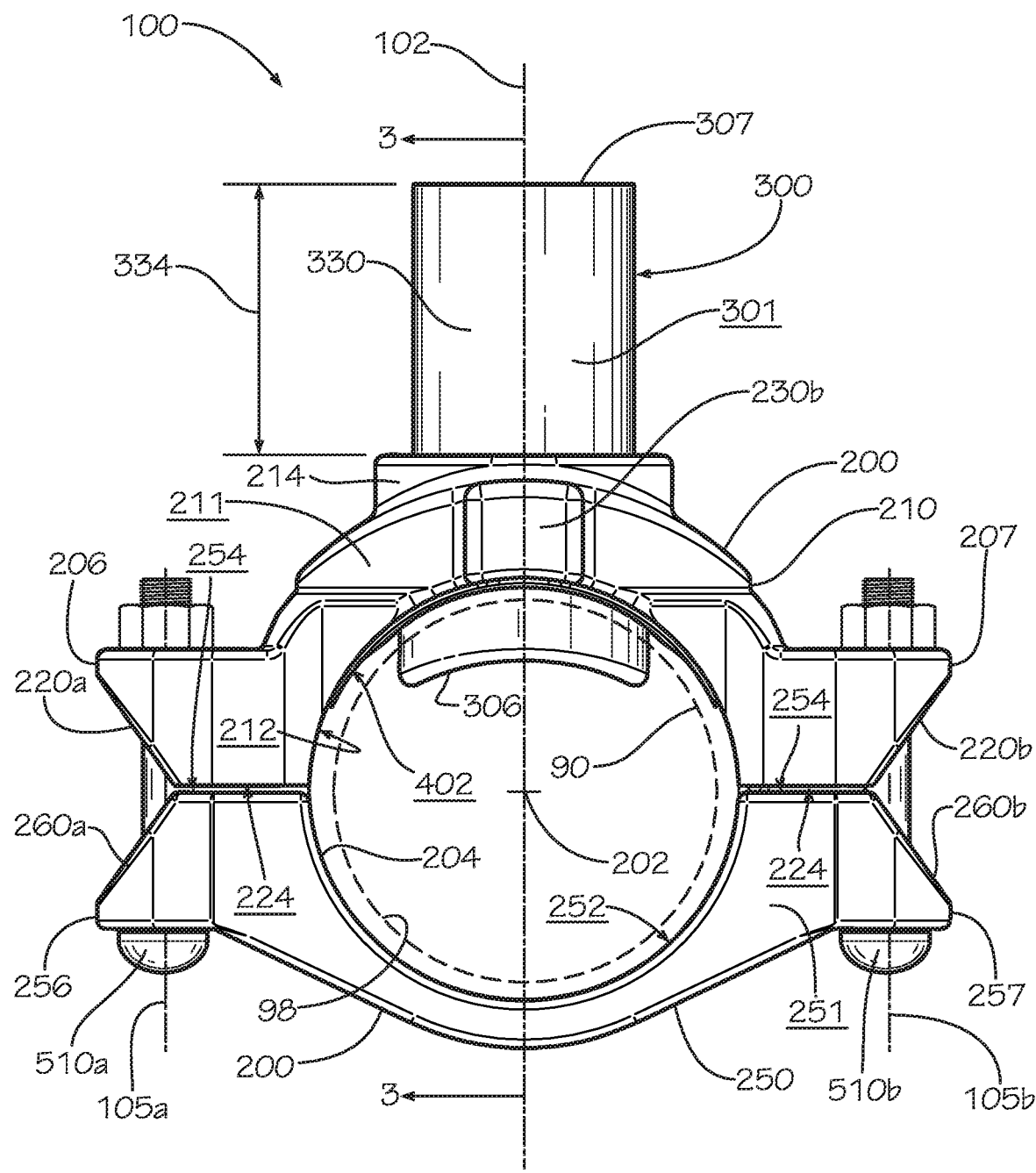
FIG. 2 is a front view of the mechanical branch outlet of FIG. 1 in an assembled state.

The lower housing 250 of the housing 200 defines an outer surface 251 and an inner surface 252. In various embodiments, the lower housing 250 includes fastener pads 260a,b, at a first end 256 and a second end 257, respectively. In various embodiments, the fasteners pads 260a,b define fastener openings 265a,b (265b not shown), which are slots in various embodiments and are cylindrical, oval, or elliptical in shape in various other embodiments, and a facing surface 254. In various embodiments, the shape of the fastener openings 265a,b in the lower housing 250 will match the shape of the fastener openings 225a,b in the upper housing 210. In various embodiments, the lower housing 250 has a semi-circular shape in a portion between the fastener pads 260a,b in order to match the curvature of the outer surface of the pipe 90. In various embodiments, the upper housing 210 and the lower housing 250 together define a pipe bore 204 when the mechanical branch outlet 100 is in an assembled state such as shown in FIG. 2.

In various embodiments, the insert 300 defines an outer surface 301 and an inner surface 302 and includes a first end 306, the second end 307, and a rim 320, which may alternatively be described as a flange, in the current embodiment. In various embodiments, the insert 300 includes a wall 308. The first end 306 and the second end 307 define outer diameters 316,317, respectively (shown in FIG. 5), and the rim 320 defines an outer diameter 324 (shown in FIG. 5). In various embodiments, an upper surface 401 of the gasket 400 can be made flat and the rim 320 of the insert 300 and the inner surface 212 of the upper housing 210 can be made flat (i.e., without curvature) to match. In such embodiments, it is primarily a lower surface 402 of the gasket and portions of the upper housing 210 and the lower housing 260 which are shaped to match the curvature of the outer surface of the pipe 90.

Figure 16:
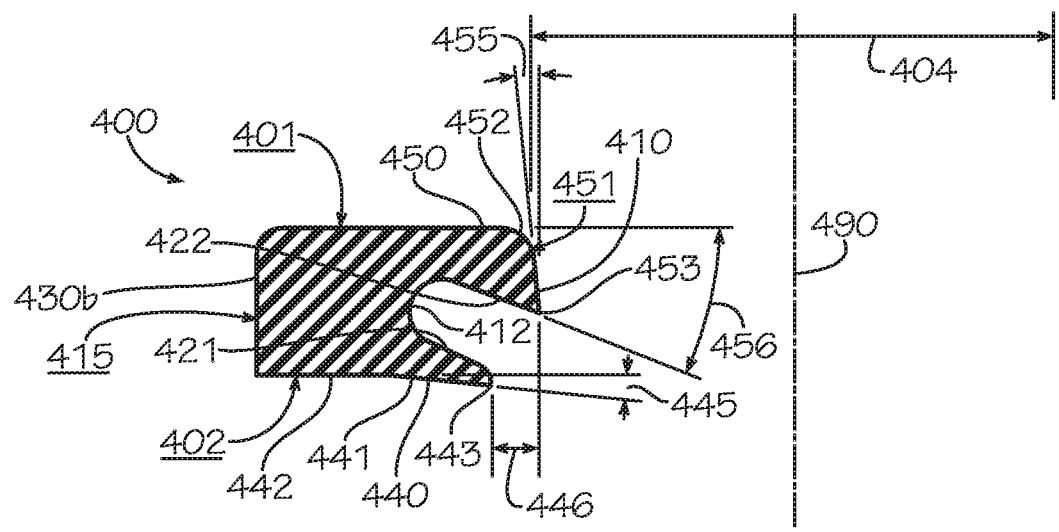
FIG. 16 is a detail sectional view of a gasket of the mechanical branch outlet of FIG. 1 taken from detail 16 of FIG. 3.

The gasket 400, a side cross-section of which is shown in and described with respect to FIG. 16, defines the upper surface 401 (shown with curvature), a lower surface 402 (shown in FIG. 16), an inner bore 410, and an outer edge surface 415. In various embodiments, the gasket has an inner diameter 404 (shown in FIG. 16) sized to receive a first end 306 of the insert 300. In various embodiments, a curvature of the upper surface 401 matches a curvature of a lower surface 321 (shown in FIG. 5) of the rim 320 of the insert 300 and also a curvature of the inside surface 212 of the upper housing 210. In various embodiments, a curvature of the lower surface 402 matches a curvature of the outer surface of the pipe 90 which in various embodiments matches a curvature of the outer surface of the pipe 90 around the transverse bore 96. In various embodiments, a curvature of the lower surface 402 matches a curvature of the outer surface of the pipe 90 even when the gasket is in a non-assembled state (i.e., the gasket 400 is formed or molded such that a curvature of the lower surface 402 matches a curvature of the outer surface of the pipe 90 even before assembling the gasket 400 to the pipe 90). In various embodiments, a curvature may be introduced into the gasket 400 during assembly of the gasket 400 to the pipe 90. In various embodiments, the curved shape of the gasket 400 results in a cross-section or profile that varies in shape depending on where the cross-section of the gasket 400 is taken. In various embodiments, the gasket 400 includes ears 430a,b—which can alternatively be described as tabs in various embodiments—sized to be received within the ears 230a,b of the upper housing 210 of the housing 200. In various embodiments, the inclusion of the ears 430a,b prevents the gasket 400 from rotating out of the correct position about the transverse bore axis 82 with respect to the pipe 90. In various embodiments, the ears 430a,b are sufficiently secured within the ears 230a,b of the upper housing 210 of the housing 200—for example, by a tight fit therein—such that the ears 430a,b can also be used to retain the gasket 400 in the housing 200. In various embodiments, the ears 230a,b or the ears 430a,b or both may have, for example, a dovetail or cylindrical shape when viewed facing along the transverse bore axis 82.

In various embodiments, the upper housing 210 and the lower housing 250 incorporate complementary features which serve to lock the upper housing 210 with respect to the lower housing 250, particularly as the mechanical branch outlet 100 is being assembled and tightened. In various embodiments, the lower housing 250 includes a tab 270 proximate the second end 257. In various embodiments, the tab 270 is rounded to ease insertion into a groove 240 defined in the upper housing 210 proximate the second end 207. When the mechanical branch outlet 100 is being assembled and tightened, axial movement of the upper housing 210 with respect to the lower housing 250 is resisted by entrapment of the tab 270 within the groove 240. The disclosure of one tab 270 and one groove 240 in the housing 200 and their particular locations should not be considered limiting on the current disclosure, however, as in various embodiments a housing such as the housing 200 may include more than one of each or no such feature as a tab 270 or a groove 240 at all. In various embodiments when present, the tab 270 and the groove 240 need not be rounded and may be of any shape or size at all as long as the tab 270 fits within the groove 240.

FIG. 2 shows the mechanical branch outlet 100 from the front in an assembled state taken along a longitudinal axis 202 of the pipe bore 204. An exposed portion 330 of the insert 300 is shown with an exposed length 334 as measured from an uppermost portion of the outer surface 211 of the upper housing 210 to the second end 307 of the insert 300. The inner surface 212 of the upper housing 210 and the inner surface 252 of the lower housing 250 of the housing 200 are shown facing each other to form the pipe bore 204. In various embodiments, the facing surface 224 of the upper housing 210 and the facing surface 254 of the lower housing 250 of the housing 200 also face each other and come into mating contact with each other during assembly and tightening of the mechanical branch outlet 100. In various embodiments, this is an indication that the mechanical branch outlet 100 has been sufficiently tightened. In various other embodiments, however, a gap can remain between the facing surface 224 of the upper housing 210 and the facing surface 254 of the lower housing 250 even after sufficient tightening of the mechanical branch outlet 100. In various embodiments, a gap can remain due to slight variations in the dimensions of the various parts including the outer diameter 94 of the pipe 90—or even to accommodate those slight variations—or because in various embodiments it is otherwise not necessary for facing surfaces of a housing such as the facing surfaces 224,254 of the housing 200 to make contact during assembly. In various embodiments, the first end 306 of the insert 300 extends through both an outer surface and an inner surface of the wall 98 of the pipe 90 and into the path of a fluid flowing through the pipe system 80. In various embodiments, by extending through at least an outer surface of the outer wall 98 of the pipe 90, the insert 300 is prevented from rotating or otherwise shifting out of its original position due to outside forces acting on one or more portions of the assembly. In various embodiments, the first end 306 can be shorter than shown or more curved than shown (to more closely match an inner diameter of the pipe 90)—or both shorter and more curved—to diminish obstruction with fluid flow, though in various other embodiments the first end 306 as shown in FIG. 2 may not obstruct fluid flow to a degree that is undesirable or only obstructs fluid flow at a level that is considered acceptable under the circumstances. In various embodiments, the lower surface 402 of the gasket 400 may extend into the bore 204 of the mechanical branch outlet 100 before tightening of the branch outlet 100 about the pipe 90. In various embodiments, this can ensure a sufficiently tight seal between the gasket 400 and the pipe 90.

Figure 3:
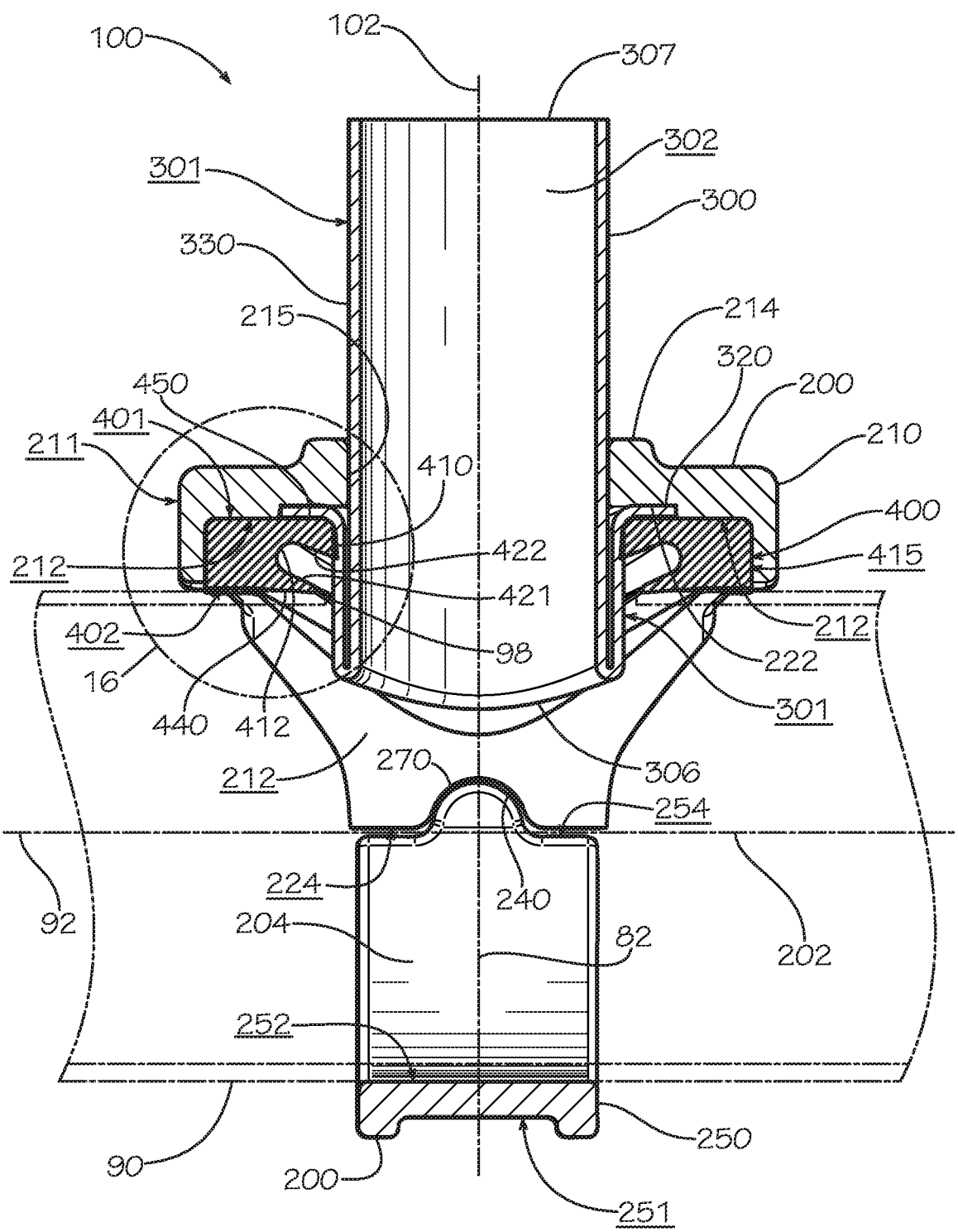
FIG. 3 is a sectional view of the mechanical branch outlet of FIG. 1 taken along line 3-3 of FIG. 2.

FIG. 3 shows the mechanical branch outlet 100 in cross-section from the side in an assembled state. In various embodiments, a recessed portion 222 defined in the inner surface 212 of the upper housing 210 is sized to receive the rim 320 of the insert 300. In various embodiments, a first sealing leg 440 contacts and seals against an outer surface of the pipe 90 when the mechanical branch outlet 100 is in an assembled state as shown. In various embodiments, a second sealing leg 450 contacts and seals against an outer surface 301 of the insert 300 when the mechanical branch outlet 100 is in an assembled state as shown. In various embodiments, the first sealing leg 440 and the second sealing leg 450 define a pocket 412 defined where fluid enters and presses the first sealing leg 440 and the second sealing leg 450 against the mating surfaces of the pipe 90 and the insert 300, respectively. In various embodiments, fluid pressure against a first side 421 of the pocket 412 strengthens the seal formed by the first sealing leg 440 against an outer surface of the pipe 90. In various embodiments, fluid pressure against a second side 422 of the pocket 412 strengthens the seal formed by the second sealing leg 450 against an outer surface 301 of the insert 300. In various embodiments, the outer diameter 316 (shown in FIG. 5) of the first end 306 of the insert 300 in a non-assembled state is slightly larger than the inner diameter 404 (shown in FIG. 16) of the gasket 400 in a non-assembled state to produce initial compression of the gasket 400 and help ensure a tight seal between the insert 300 and the gasket 400. In various embodiments, the outer diameter 316 of the first end 306 of the insert 300 in a non-assembled state is about equal to the inner diameter 404 of the gasket 400 in a non-assembled state but features of the gasket 400 such as the second sealing leg 450 project, at least in part, radially inward from where the inner diameter 404 is measured to produce initial compression of the gasket 400 and help ensure a tight seal between the insert 300 and the gasket 400. In various embodiments, each of the first sealing leg 440, the second sealing leg 450, and other sealing legs of various embodiments may include various surfaces, tips, and portions and define various angles and other features hereinafter described. The first sealing leg 440, the second sealing leg 450, and other sealing legs of various embodiments may alternatively be described as a sealing lip or a seal.

Figure 5:
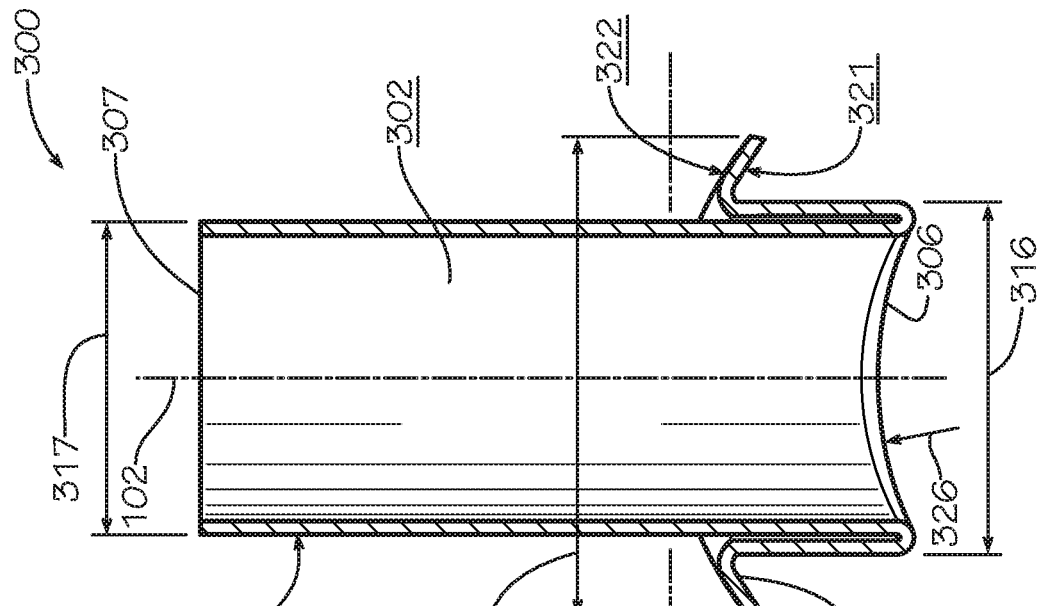
FIG. 5 is a sectional view of the insert of FIG. 4 taken along line 5-5 of FIG. 4.
Figure 4:
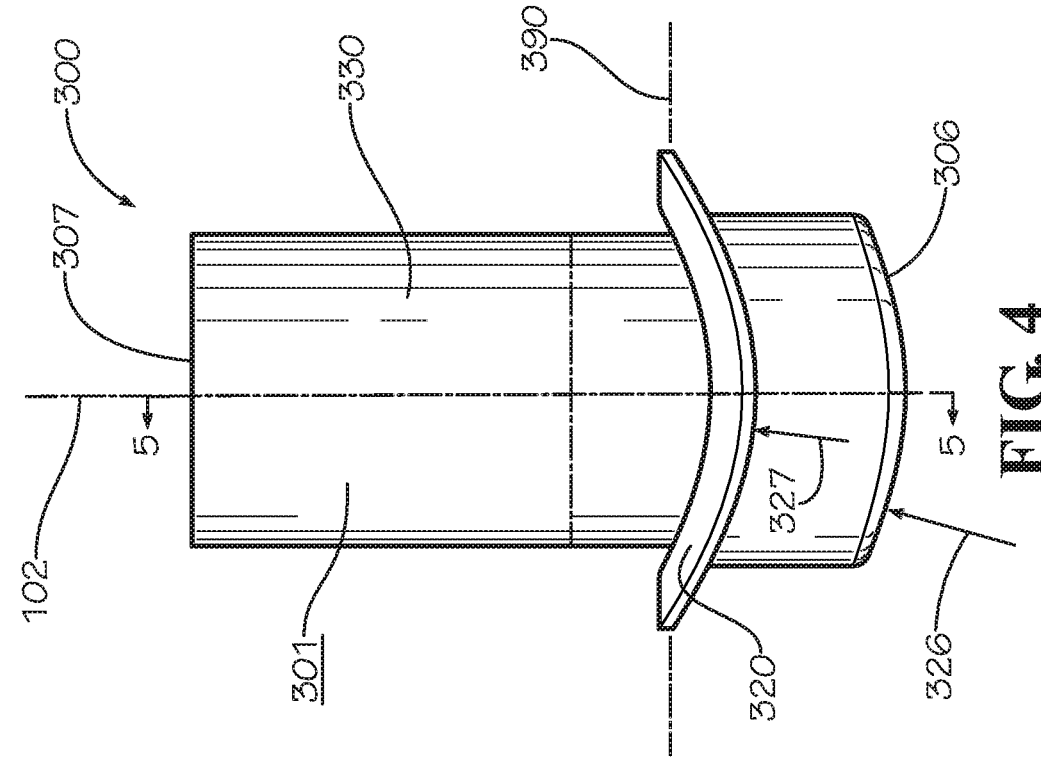
FIG. 4 is a side view of an insert of the mechanical branch outlet of FIG. 1 taken along line 4-4 of FIG. 1.

FIGS. 4 and 5 show a side view and a cross-sectional view, respectively, of the insert 300. In various embodiments, an angle $\theta_1$ of the rim 320 as measured between a horizontal plane 390 and the upper surface 322 of the rim 320 varies between a minimum of zero degrees at the front and rear to a maximum of between zero and 90 degrees. In various embodiments, the angle $\theta_1$ reaches a maximum of approximately 30 to 35 degrees. The disclosure of the angle $\theta_1$ reaching a maximum of approximately 30 to 35 degrees should not be considered limiting on the current disclosure, however, as the angle $\theta_1$ may reach a maximum value outside of this range depending on the diameter and shape of the pipe 90 to which the mechanical branch outlet 100 is assembled. In various embodiments, a curvature of the surface 322 matches a curvature of the inside surface 212 of the upper housing 210. In various embodiments, the rim 320 defines a curvature not only at each angular location around the perimeter of the insert 300 but defines a curvature from a radially inward portion of the rim 320 to a radially outward portion of the rim 320 and in such case the angle $\theta_1$ is the average angle of the rim 320 with respect to the horizontal plane 390 in a radial direction relative to axis 102. In various embodiments, a curvature of the upper surface 322 at a particular portion of the rim 320 and a curvature 327 of the lower surface 321 at the same portion of the rim 320 may vary by a material thickness T of the insert 300. Again, the first end 306 of the insert 300 is shown having the outer diameter 316, and the second end 307 of the insert 300 is shown having the outer diameter 317. In various embodiments, an axially outermost edge of the first end 306 defines a curvature 326. In various embodiments, the curvature 326 alternates between concave and convex in shape depending on the point on the insert 300 at which the curvature 326 is being measured. In various embodiments, an axially outermost edge of the second end 307 is flat. In various embodiments, an axially outermost portion of the second end 307 is expanded such that the insert 300 is able to receive a portion of a piping system element such as plain-end copper pipe sufficient in length for sweating or brazing to the insert 300. In various embodiments, a portion of the outer surface 301 of the insert 300 proximate the second end 307 defines an annular groove sized to receive a pipe coupling or other connecting element for connecting the insert 300 to a piping system element such as a pipe with a similar annular groove on at least one end.

Figure 6:
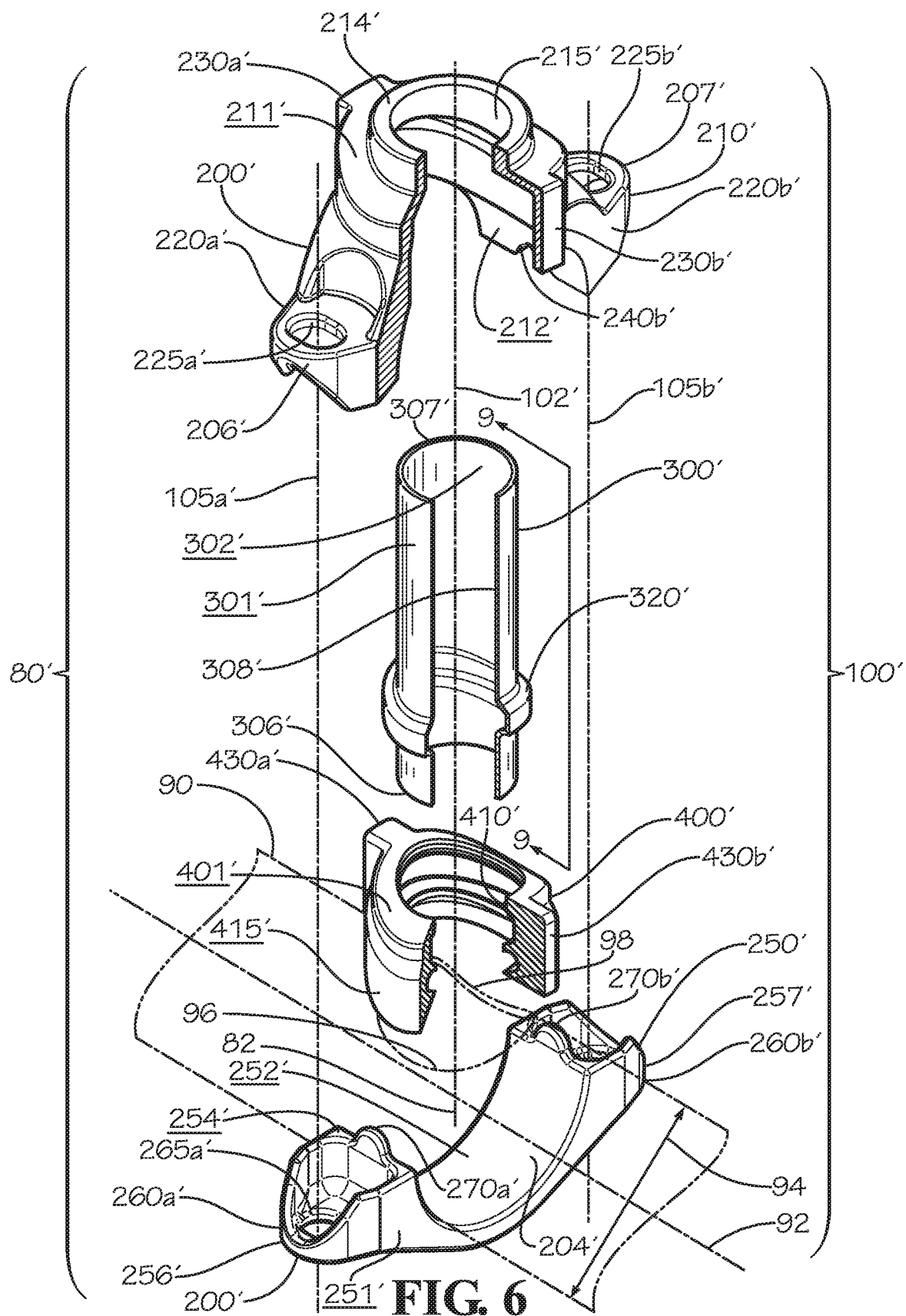
FIG. 6 is a partially sectioned perspective exploded view of a piping system including a mechanical branch outlet in accordance with another embodiment of the current disclosure.

FIG. 6 discloses and describes another embodiment of a mechanical branch outlet 100' for use in a pipe system 80'. The pipe system 80' includes the mechanical branch outlet 100' and a pipe 90. In various embodiments, the mechanical branch outlet 100' includes a housing 200', an insert 300', and a gasket 400'. In various embodiments, the housing 200' includes an upper housing 210' and a lower housing 250'. In various embodiments, fasteners (not shown) are positioned along a pair of axes 105a',b' to assemble and tighten the mechanical branch outlet 100' about the pipe 90. In various embodiments, such fasteners include, but are not limited to, a bolt and nut combination. In various embodiments, the bolt and nut combination and the lower housing 250' can be replaced with a U-bolt (not shown) with upward-facing threaded portions (not shown) aligned along axes 105a',b' for tightening to the pipe 90 an upper housing and the remaining elements of a mechanical branch outlet like the mechanical branch outlet 100'.

The upper housing 210' of the housing 200' defines an outer surface 211' and an inner surface 212'. In various embodiments, the upper housing 210' defines an outlet bore 215' defined in a boss 214' and extending between the outer surface 211' and the inner surface 212'. The outlet bore 215' aligns with the axis 102' during assembly of the mechanical branch outlet 100'. In various embodiments, the outlet bore 215' of the upper housing 210' is sized to receive a second end 307' of the insert 300'. In various embodiments, the upper housing 210' includes fastener pads 220a',b', at a first end 206' and a second end 207', respectively. In various embodiments, the fasteners pads 220a',b' define fastener openings 225a',b', which are slots in various embodiments and are cylindrical, oval, or elliptical in shape in various other embodiments, and a facing surface 224' (shown in FIG. 7). In various embodiments, the upper housing 210' has a semi-circular shape in a portion between the fastener pads 220a',b' in order to match the curvature of the outer surface of the pipe 90. In various embodiments, a curvature of the inner surface 212' matches a curvature of the outer surface of the pipe 90. In various embodiments, the upper housing 210' includes ears 230a',b', which define protruded portions of the outer surface 211' and indented portions of the inner surface 212'.

Figure 7:
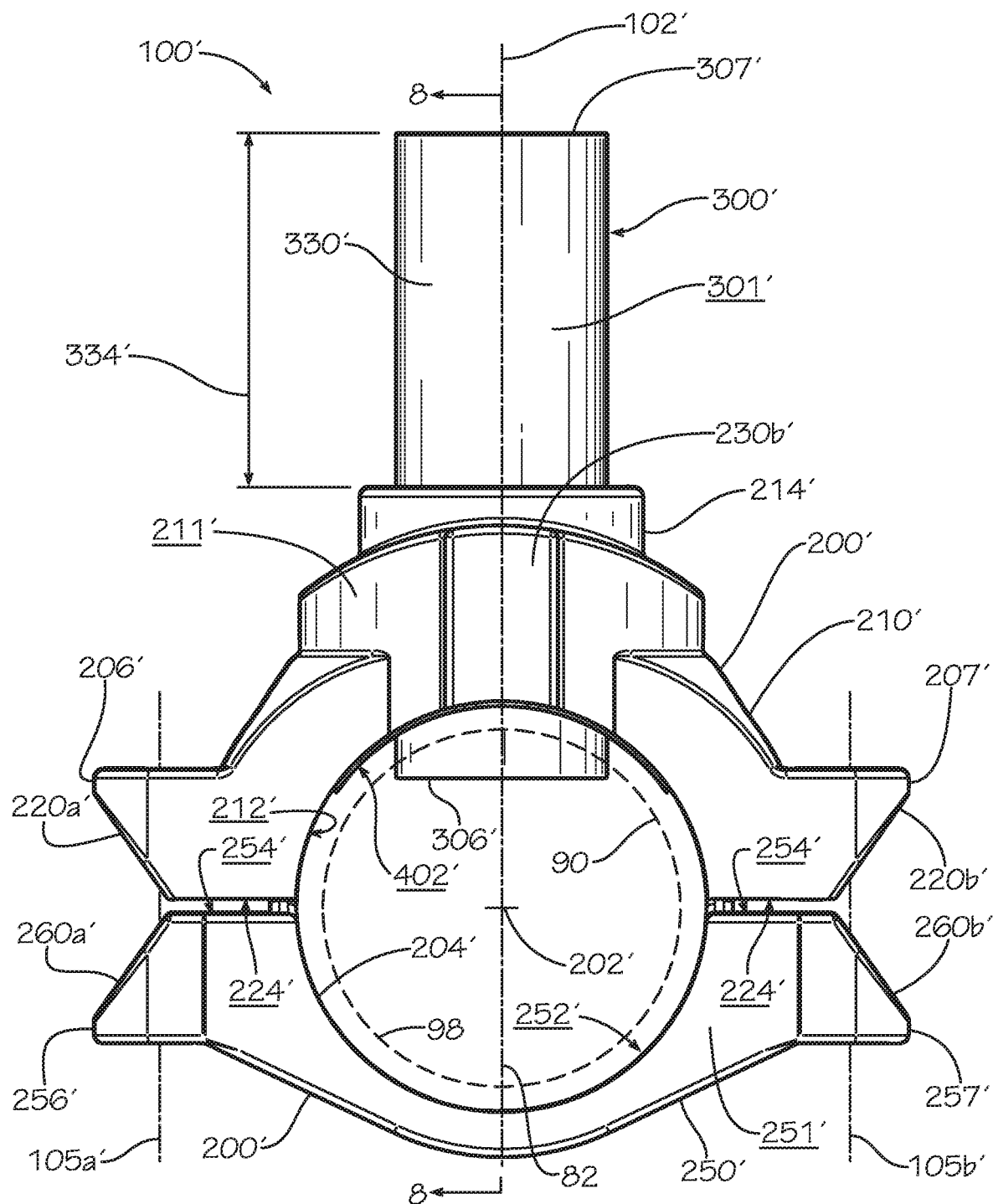
FIG. 7 is a front view of the mechanical branch outlet of FIG. 6 in an assembled state.

The lower housing 250' of the housing 200' defines an outer surface 251' and an inner surface 252'. In various embodiments, the lower housing 250' includes fastener pads 260a',b', at a first end 256' and a second end 257', respectively. In various embodiments, the fasteners pads 260a',b' define fastener openings 265a',b' (265b' not shown), which are slots in various embodiments and are cylindrical, oval, or elliptical in shape in various other embodiments, and a facing surface 254'. In various embodiments, the shape of the fastener openings 265a',b' in the lower housing 250' will match the shape of the fastener openings 225a',b' in the upper housing 210'. In various embodiments, the lower housing 250' has a semi-circular shape in a portion between the fastener pads 260a',b' in order to match the curvature of the outer surface of the pipe 90. In various embodiments, the upper housing 210' and the lower housing 250' together define a pipe bore 204' when the mechanical branch outlet 100' is in an assembled state such as shown in FIG. 7.

In various embodiments, the insert 300' defines an outer surface 301' and an inner surface 302' and includes a first end 306', the second end 307', and a rim 320', which may alternatively be described as a flange in the current embodiment. In various embodiments, the insert 300' includes a wall 308'. The first end 306' and the second end 307' define outer diameters 316',317', respectively (shown in FIG. 10), and the rim 320' defines an outer diameter 324' (shown in FIG. 10). In various embodiments, an upper surface 401' of the gasket 400' can be made flat and the rim 320' of the insert 300' and the inner surface 212' of the upper housing 210' can be made flat (i.e., without curvature) to match. In such embodiments, it is primarily a lower surface 402' of the gasket and portions of the upper housing 210' and the lower housing 260' which are shaped to match the curvature of the outer surface of the pipe 90.

Figure 17:
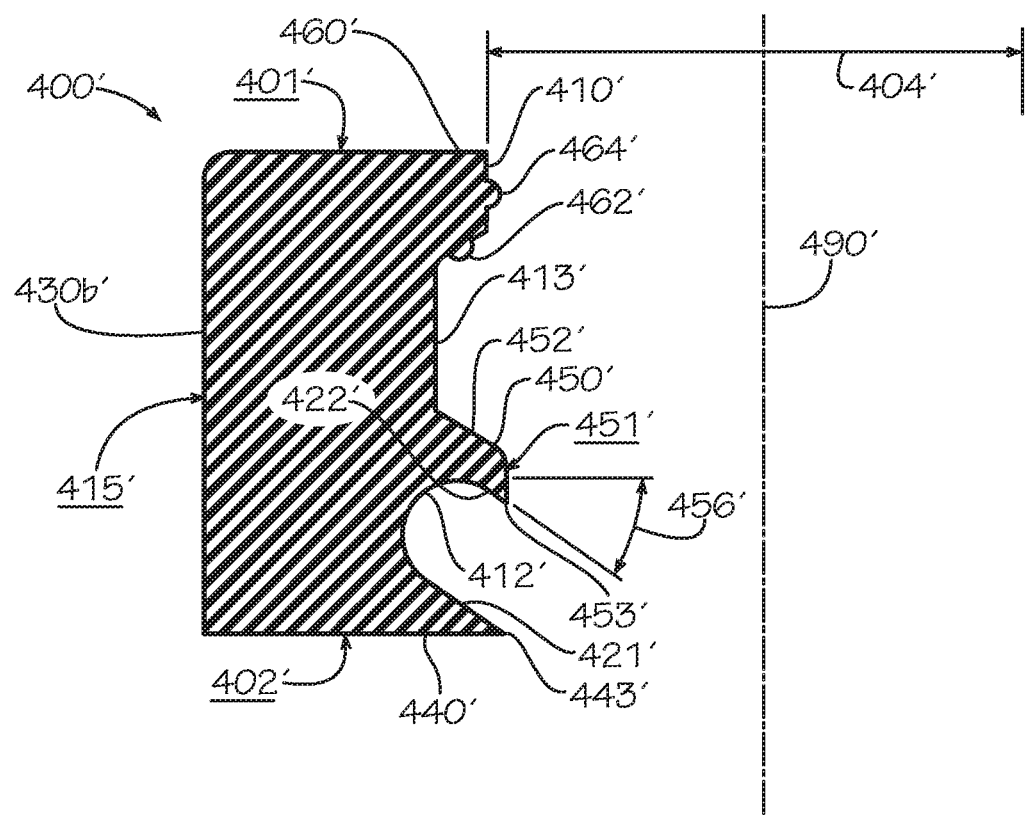
FIG. 17 is a detail sectional view of a gasket of the mechanical branch outlet of FIG. 6 taken from detail 17 of FIG. 8.

The gasket 400', a side cross-section of which is shown in and described with respect to FIG. 17, defines the upper surface 401' (shown with curvature), a lower surface 402' (shown in FIG. 7), an inner bore 410', and an outer edge surface 415'. In various embodiments, the gasket has an inner diameter 404' (shown in FIG. 17) sized to receive a first end 306' of the insert 300'. In various embodiments, a curvature of the inner bore 410' matches a curvature of a lower surface 321' (shown in FIG. 10), an upper surface 322' (shown in FIG. 10), and an edge surface 323' (shown in FIG. 10) of the rim 320' of the insert 300'. In various embodiments, a curvature of the upper surface 401' matches a curvature of the inside surface 212' of the upper housing 210'. In various embodiments, a curvature of the lower surface 402' matches a curvature of the outer surface of the pipe 90 which in various embodiments matches a curvature of the outer surface of the pipe 90 around the transverse bore 96. In various embodiments, a curvature of the lower surface 402' matches a curvature of the outer surface of the pipe 90 even when the gasket 400' is in a non-assembled state (i.e., the gasket 400' is formed or molded such that a curvature of the lower surface 402' matches a curvature of the outer surface of the pipe 90 even before assembling the gasket 400' to the pipe 90). In various embodiments, a curvature may be introduced into the gasket 400' during assembly of the gasket 400' to the pipe 90. In various embodiments, the curved shape of the gasket 400' results in a cross-section or profile that varies in shape depending on where the cross-section of the gasket 400' is taken. In various embodiments, the gasket 400' includes ears 430a',b' sized to be received within the ears 230a',b' of the upper housing 210' of the housing 200'. In various embodiments, the inclusion of the ears 430a',b' prevents the gasket 400' from rotating out of the correct position about the transverse bore axis 82 with respect to the pipe 90. In various embodiments, the ears 430a',b' are sufficiently secured within the ears 230a',b' of the upper housing 210' of the housing 200'—for example, by a tight fit therein—such that the ears 430a',b' can also be used to retain the gasket 400' in the housing 200'. In various embodiments, the ears 230a',b' or the ears 430a',b' or both may have, for example, a dovetail or cylindrical shape when viewed facing along the transverse bore axis 82.

In various embodiments, the upper housing 210' and the lower housing 250' incorporate complementary features which serve to lock the upper housing 210' with respect to the lower housing 250', particularly as the mechanical branch outlet 100' is being assembled and tightened. In various embodiments, the lower housing 250' includes a tab 270a' proximate a first end 256' and a tab 270b' proximate a second end 257'. In various embodiments, each of the tabs 270a',b' is rounded to ease insertion into grooves 240a',b', respectively (240a' not shown), defined in the upper housing 210' proximate a first end 256' and a second end 257', respectively. When the mechanical branch outlet 100' is being assembled and tightened, axial movement of the upper housing 210' with respect to the lower housing 250' is resisted by entrapment of the tabs 270a',b' within the grooves 240a',b', respectively. The disclosure of two tabs 270a',b' and grooves 240a',b' in the housing 200' should not be considered limiting on the current disclosure, however, as in various embodiments a housing such as the housing 200' may include only one set or no such feature as a tab 270' or a groove 240' at all. In various embodiments when present, the tab 270' and the groove 240' need not be rounded and may be of any shape or size at all as long as the tab 270' fits within the groove 240'.

FIG. 7 shows the mechanical branch outlet 100' from the front in an assembled state taken along a longitudinal axis 202' of the pipe bore 204'. An exposed portion 330' of the insert 300' is shown with an exposed length 334' as measured from an uppermost portion of the outer surface 211' of the upper housing 210' to the second end 307' of the insert 300'. The inner surface 212' of the upper housing 210' and the inner surface 252' of the lower housing 250' of the housing 200' are shown facing each other to form the pipe bore 204'. In various embodiments, the facing surface 224' of the upper housing 210' and the facing surface 254' of the lower housing 250' of the housing 200' also face each other and come into mating contact with each other during assembly and tightening of the mechanical branch outlet 100'. In various embodiments, this is an indication that the mechanical branch outlet 100' has been sufficiently tightened. In various other embodiments, however, a gap can remain between the facing surface 224' of the upper housing 210' and the facing surface 254' of the lower housing 250' even after sufficient tightening of the mechanical branch outlet 100'. In various embodiments, the first end 306' of the insert 300' extends through both an outer surface and an inner surface of the outer wall 98 of the pipe 90 and into the path of a fluid flowing through the pipe system 80'. In various embodiments, by extending through at least an outer surface of the outer wall 98 of the pipe 90, the insert 300' is prevented from rotating or otherwise shifting out of its original position due to outside forces acting on one or more portions of the assembly. In various embodiments, the first end 306' can be shorter than shown or curved (to more closely match an inner diameter of the pipe 90)—or both shorter and curved—to diminish obstruction with fluid flow, though in various other embodiments the first end 306' as shown in FIG. 7 may not obstruct fluid flow to a degree that is undesirable or only obstructs fluid flow at a level that is considered acceptable under the circumstances. In various embodiments, the lower surface 402' of the gasket 400' may extend into the bore 204' of the mechanical branch outlet 100' before tightening of the branch outlet 100' about the pipe 90. In various embodiments, this can ensure a sufficiently tight seal between the gasket 400' and the pipe 90.

Figure 8:
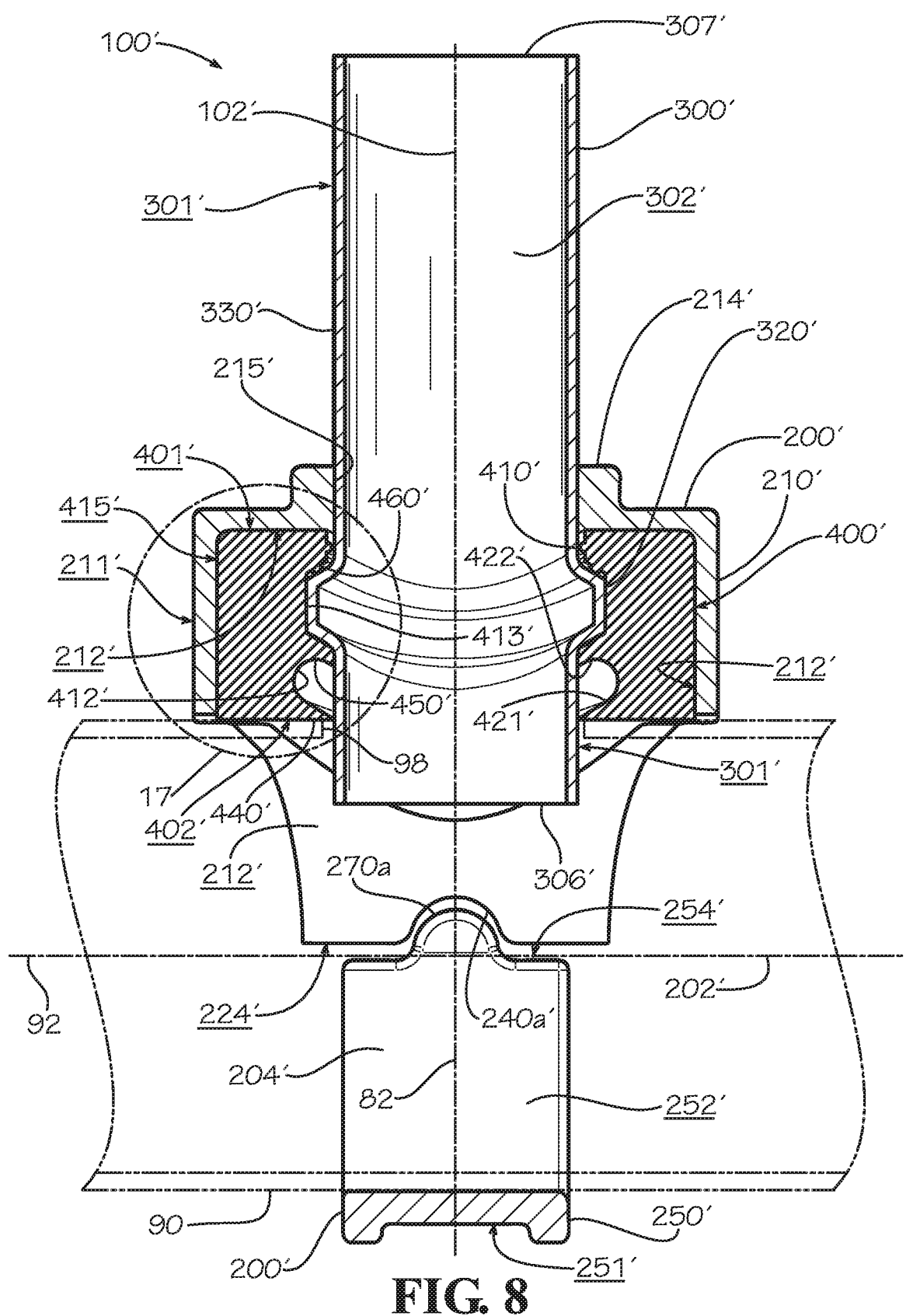
FIG. 8 is a sectional view of the mechanical branch outlet of FIG. 6 taken along line 8-8 of FIG. 7.

FIG. 8 shows the mechanical branch outlet 100' in cross-section from the side in an assembled state. In various embodiments, a recess 413' defined in the bore 410' of the gasket 400' is sized to receive the rim 320' of the insert 300'. In various embodiments, a first sealing leg 440' contacts and seals against an outer surface of the pipe 90 when the mechanical branch outlet 100' is in an assembled state as shown. In various embodiments, a second sealing leg 450' contacts and seals against an outer surface 301' of the insert 300' when the mechanical branch outlet 100' is in an assembled state as shown. In various embodiments, the first sealing leg 440' and the second sealing leg 450' define a pocket 412' defined where fluid enters and presses the first sealing leg 440' and the second sealing leg 450' against the mating surfaces of the pipe 90 and the insert 300', respectively. In various embodiments, fluid pressure against a first side 421' of the pocket 412' strengthens the seal formed by the first sealing leg 440' against an outer surface of the pipe 90. In various embodiments, fluid pressure against a second side 422' of the pocket 412' strengthens the seal formed by the second sealing leg 450' against an outer surface 301' of the insert 300'. In various embodiments, a third sealing leg 460' also contacts and seals against an outer surface 301' of the insert 300' at a point on the insert 300' above the rim 320' when the mechanical branch outlet 100' is in an assembled state as shown. In various embodiments, the outer diameter 316' (shown in FIG. 10) of the first end 306' of the insert 300' in a non-assembled state is slightly larger than the inner diameter 404' (shown in FIG. 17) of the gasket 400' in a non-assembled state to produce initial compression of the gasket 400 and help ensure a tight seal between the insert 300' and the gasket 400'. In various embodiments, the outer diameter 316' of the first end 306' of the insert 300' in a non-assembled state is about equal to the inner diameter 404' of the gasket 400' in a non-assembled state but features of the gasket 400' such as the second sealing leg 450' project, at least in part, radially inward from where the inner diameter 404' is measured to produce initial compression of the gasket 400' and help ensure a tight seal between the insert 300' and the gasket 400'. In various embodiments, each of the first sealing leg 440', the second sealing leg 450', and other sealing legs of various embodiments may include various surfaces, tips, and portions and define various angles and other features hereinafter described. The first sealing leg 440', the second sealing leg 450', and other sealing legs of various embodiments may alternatively be described as a sealing lip or a seal.

Figure 10:
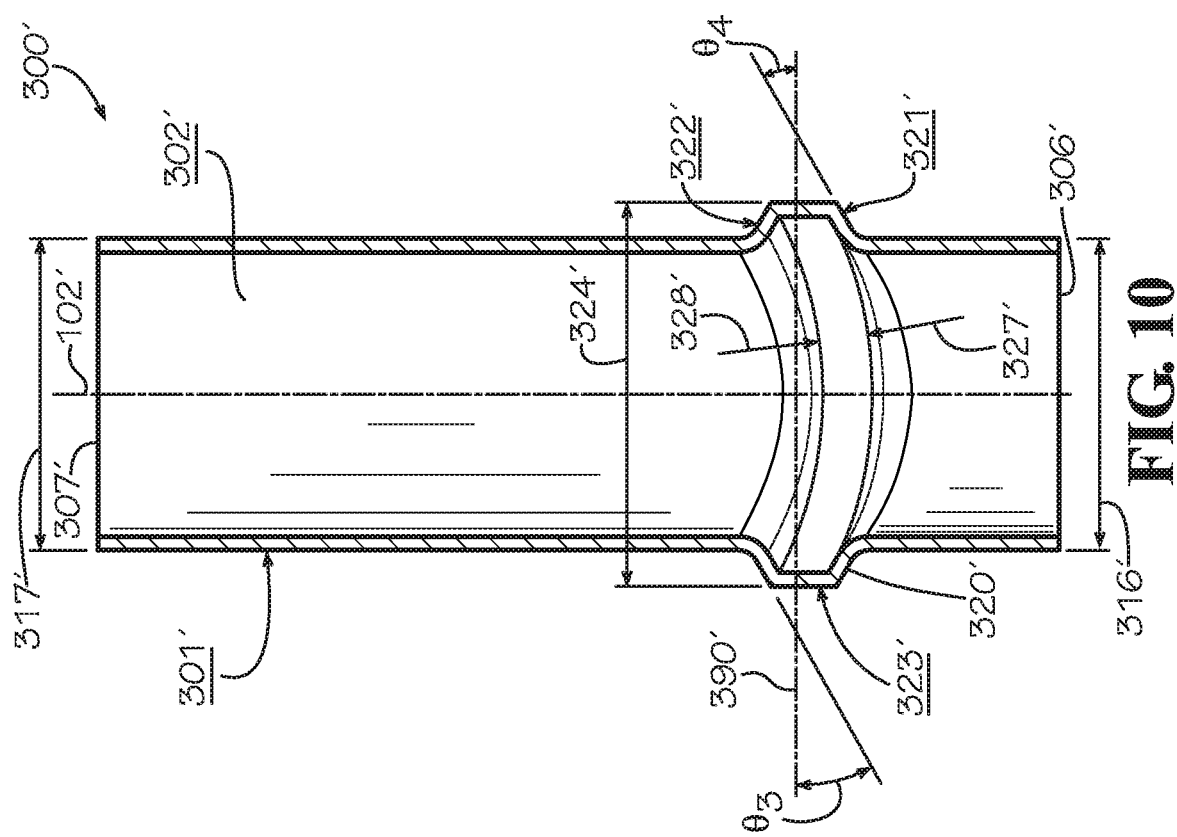
FIG. 10 is a sectional view of the insert of FIG. 9 taken along line 10-10 of FIG. 9.
Figure 9:
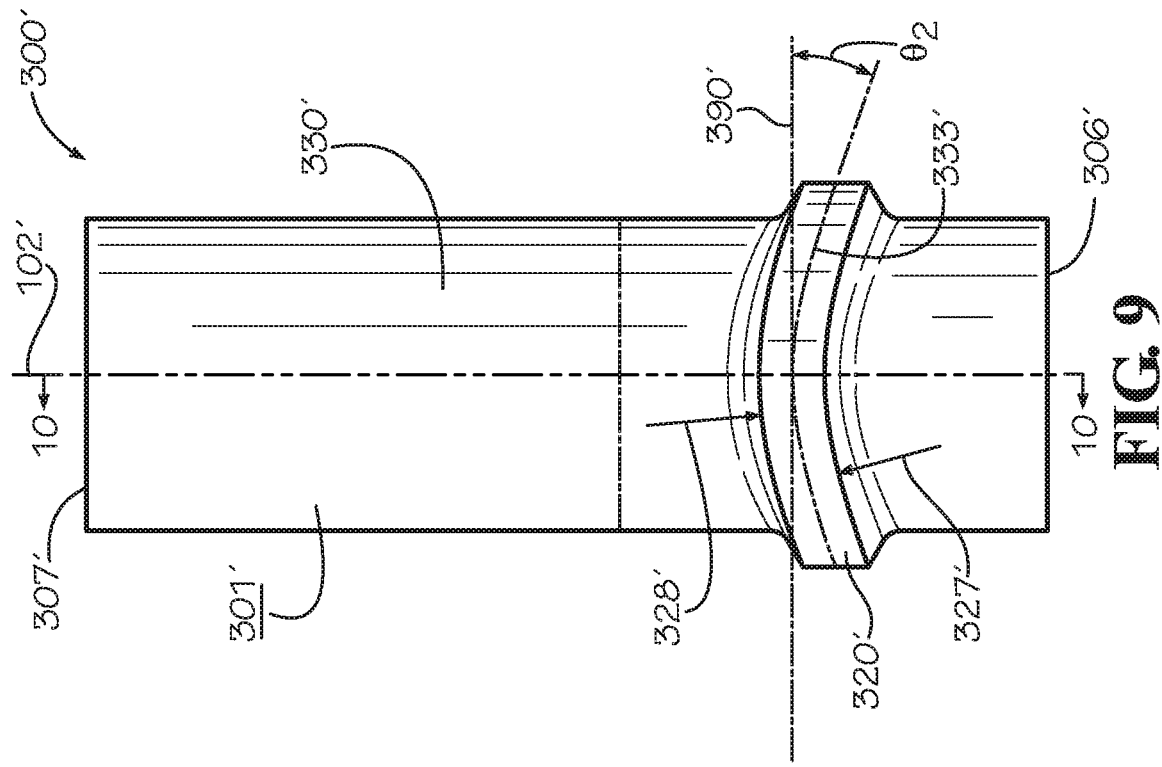
FIG. 9 is a front view of an insert of the mechanical branch outlet of FIG. 6 taken along line 9-9 of FIG. 6.

FIGS. 9 and 10 show a front view and a cross-sectional view, respectively, of the insert 300'. In various embodiments, an angle $\theta_2$ of the rim 320' as measured between a horizontal plane 390' and a tangent of a centerline 333' of the edge surface 323' of the rim 320' when viewed from the front varies between a minimum of zero degrees at the front and rear to a maximum of between zero and 90 degrees. In various embodiments, the angle $\theta_2$ reaches a maximum of approximately 15 to 20 degrees. The disclosure of the angle $\theta_2$ reaching a maximum of between 15 and 20 degrees should not be considered limiting on the current disclosure, however, as the angle $\theta_2$ may reach a maximum value outside of this range depending on the diameter and shape of the pipe 90 to which the mechanical branch outlet 100' is assembled. In various embodiments, a curvature of the upper surface 322' and a curvature of the lower surface 321' match a curvature of the recess 413' of the gasket 400'.

In various embodiments, an angle $\theta_3$ of the rim 320' as measured between a horizontal plane 390' and an upper surface 322' (shown in FIG. 10) of the rim 320 and an angle $\theta_4$ of the rim 320' as measured between a horizontal plane 390' and an lower surface 321' (shown in FIG. 10) of the rim 320' each varies between zero and 90 degrees. In various embodiments, the rim 320' defines a curvature 327' at the radially outward edge of the lower surface 321' and a curvature 328' at the radially outward edge of the upper surface 322' not only at each angular location around the perimeter of the insert 300' but also defines a curvature from a radially inward portion of the rim 320' to a radially outward portion of the rim 320' in a radial direction relative to axis 102'. Therefore, in various embodiments the angle $\theta_3$ is an average angle of the upper surface 322' with respect to the horizontal plane 390', and the angle $\theta_4$ is an average angle of the lower surface 321' with respect to the horizontal plane 390'. In various embodiments, the curvature 328' of the upper surface 322' and the curvature 327' of the lower surface 321' of the rim 320' may vary by an amount equal to a distance between an upper edge and a lower edge of the edge surface 323a' of the rim 320'. Again, the first end 306' of the insert 300' is shown having the outer diameter 316', and the second end 307' of the insert 300' is shown having the outer diameter 317'. In various embodiments, an axially outermost edge of the first end 306' is flat as shown. In various other embodiments, an axially outermost edge of the first end 306' defines a curvature (not shown). In various embodiments, an axially outermost edge of the second end 307' is flat. In various embodiments, an axially outermost portion of the second end 307' is expanded such that the insert 300' is able to receive a portion of a piping system element such as plain-end copper pipe sufficient in length for sweating or brazing to the insert 300'. In various embodiments, a portion of the outer surface 301' of the insert 300' proximate to the second end 307' defines an annular groove sized to receive a pipe coupling or other connecting element for connecting the insert 300' to a piping system element such as a pipe with a similar annular groove on at least one end.

Figure 11:
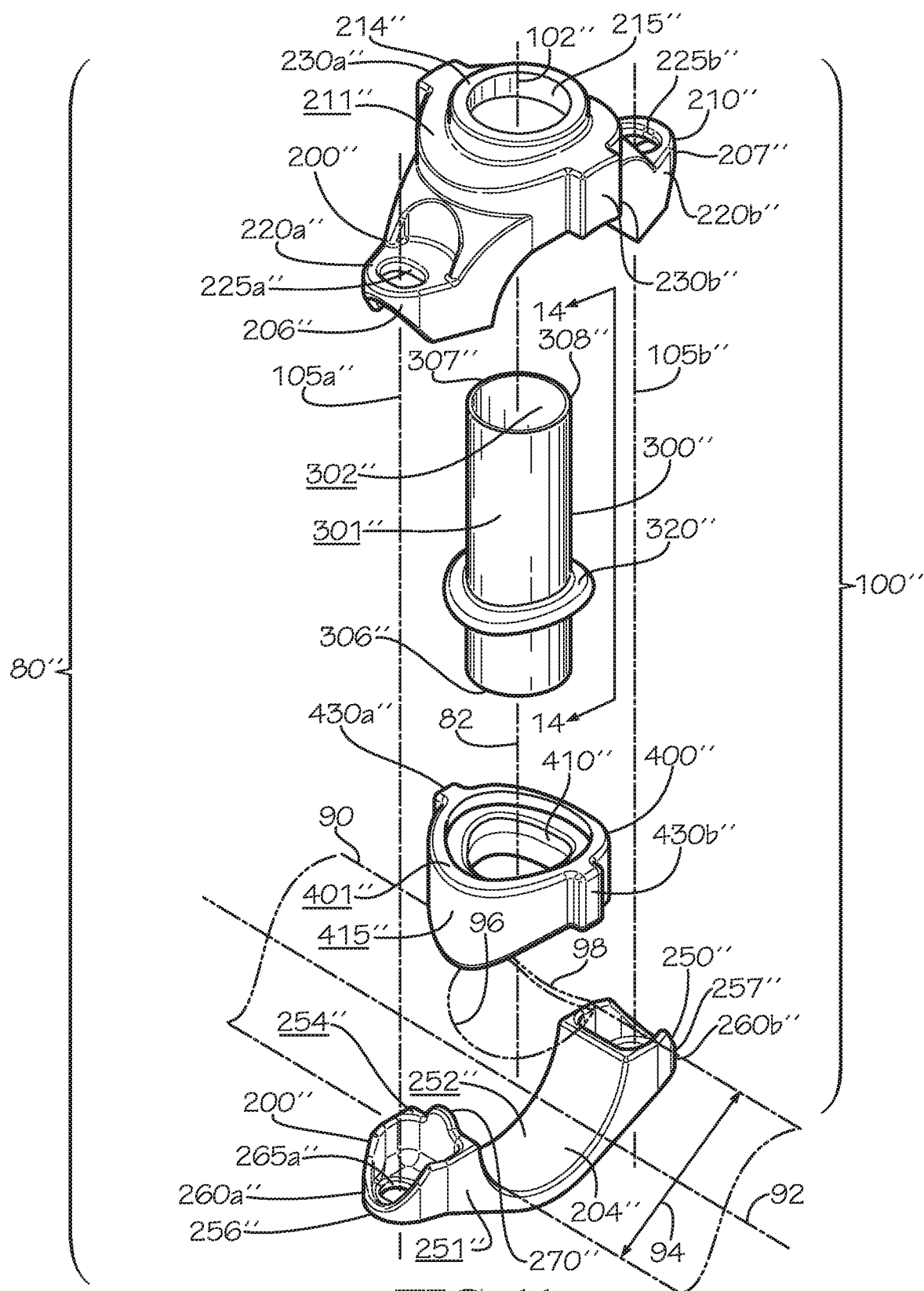
FIG. 11 is a perspective exploded view of a piping system including a mechanical branch outlet in accordance with yet another embodiment of the current disclosure.

FIG. 11 shows another embodiment of a mechanical branch outlet 100" for use in a pipe system 80". The pipe system 80" includes the mechanical branch outlet 100" and a pipe 90. In various embodiments, the mechanical branch outlet 100" includes a housing 200", an insert 300", and a gasket 400". In various embodiments, the housing 200" includes an upper housing 210" and a lower housing 250". In various embodiments, fasteners (not shown) are positioned along a pair of axes 105a",b" to assemble and tighten the mechanical branch outlet 100" about the pipe 90. In various embodiments, such fasteners include, but are not limited to, a bolt and nut combination. In various embodiments, the bolt and nut combination and the lower housing 250" can be replaced with a U-bolt (not shown) with upward-facing threaded portions (not shown) aligned along axes 105a",b" for tightening to the pipe 90 an upper housing and the remaining elements of a mechanical branch outlet like the mechanical branch outlet 100".

The upper housing 210" of the housing 200" defines an outer surface 211" and an inner surface 212". In various embodiments, the upper housing 210" defines an outlet bore 215" defined in a boss 214" and extending between the outer surface 211" and the inner surface 212" that aligns with the axis 102" during assembly of the mechanical branch outlet 100". In various embodiments, the outlet bore 215" of the upper housing is sized to receive a second end 307" of the insert 300". In various embodiments, the upper housing 210" includes fastener pads 220a",b", at a first end 206" and a second end 207', respectively. In various embodiments, the fasteners pads 220a",b" define fastener openings 225a",b", which are slots in various embodiments and are cylindrical, oval, or elliptical in shape in various other embodiments, and a facing surface 224" (shown in FIG. 12). In various embodiments, the upper housing 210" has a semi-circular shape in a portion between the fastener pads 220a",b" in order to match the curvature of the outer surface of the pipe 90. In various embodiments, a curvature of the inner surface 212" matches a curvature of the outer surface of the pipe 90. In various embodiments, the upper housing 210" includes ears 230a",b", which define protruded portions of the outer surface 211" and indented portions of the inner surface 212".

Figure 12:
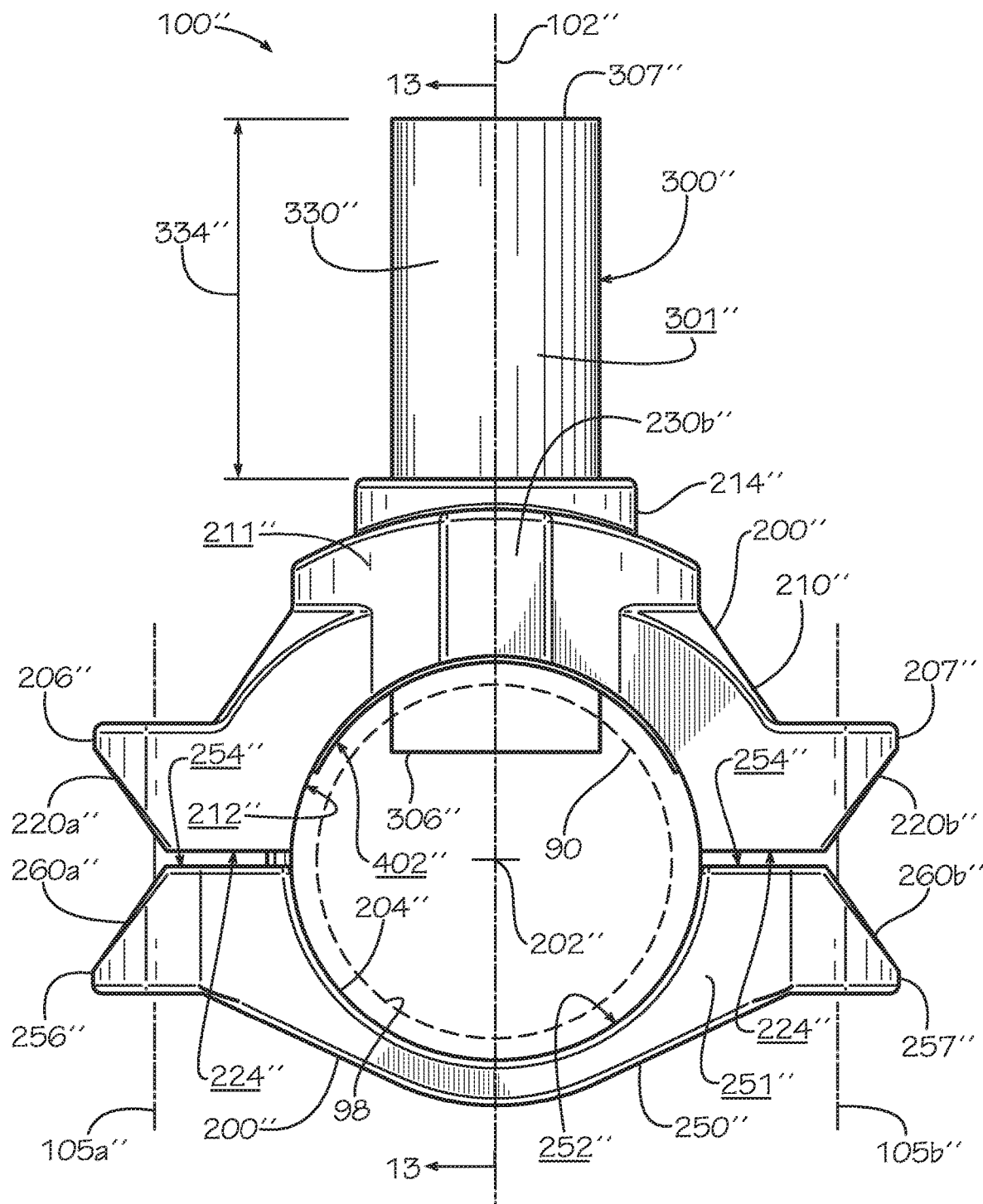
FIG. 12 is a front view of the mechanical branch outlet of FIG. 11 in an assembled state.

The lower housing 250" of the housing 200" defines an outer surface 251" and an inner surface 252". In various embodiments, the lower housing 250" includes fastener pads 260a",b", at a first end 256" and a second end 257", respectively. In various embodiments, the fasteners pads 260a",b" define fastener openings 265a",b" (265b" not shown), which are slots in various embodiments and are cylindrical, oval, or elliptical in shape in various other embodiments, and a facing surface 254". In various embodiments, the shape of the fastener openings 265a",b" in the lower housing 250" will match the shape of the fastener openings 225a",b" in the upper housing 210". In various embodiments, the lower housing 250" has a semi-circular shape in a portion between the fastener pads 260a",b" in order to match the curvature of the outer surface of the pipe 90. In various embodiments, the upper housing 210" and the lower housing 250" together define a pipe bore 204" when the mechanical branch outlet 100" is in an assembled state such as shown in FIG. 12.

In various embodiments, the insert 300" defines an outer surface 301" and an inner surface 302" and includes a first end 306", the second end 307", and a rim 320", which may alternatively be described as a flange in the current embodiment. In various embodiments, the insert 300" includes a wall 308". The first end 306" and the second end 307" define outer diameters 316",317", respectively (both shown in FIG. 15), and the rim 320" defines an outer diameter 324" (also shown in FIG. 15). In various embodiments, an upper surface 401" of the gasket 400" can be made flat and the rim 320" of the insert 300" and the inner surface 212" of the upper housing 210" can be made flat (i.e., without curvature) to match. In such embodiments, it is primarily a lower surface 402" of the gasket and portions of the upper housing 210" and the lower housing 260" which are shaped to match the curvature of the outer surface of the pipe 90.

Figure 18:
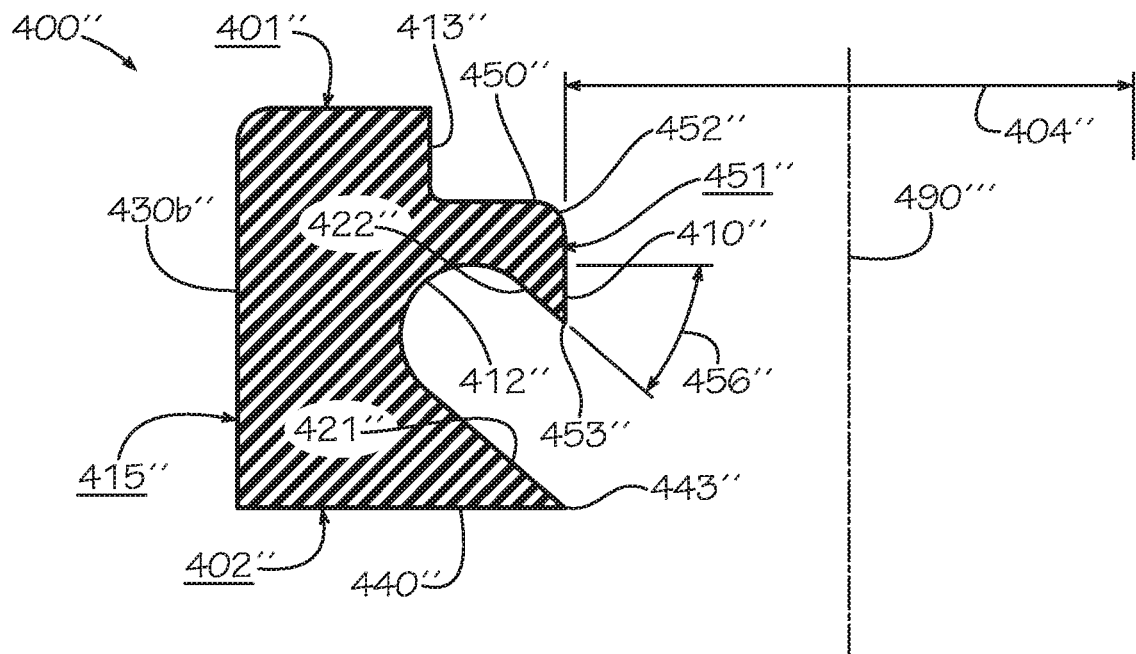
FIG. 18 is a detail sectional view of a gasket of the mechanical branch outlet of FIG. 6 taken from detail 18 of FIG. 13.

The gasket 400", a side cross-section of which is shown in and described with respect to FIG. 18, defines the upper surface 401" (shown with curvature), a lower surface 402" (shown in FIG. 12), an inner bore 410", and an outer edge surface 415". In various embodiments, the gasket has an inner diameter 404" (shown in FIG. 18) sized to receive a first end 306" of the insert 300". In various embodiments, a curvature of a recess 413" of the bore 410" matches a curvature of a lower surface 321" (shown in FIG. 15) and a curvature of an edge surface 323" (also shown in FIG. 15) of the rim 320" of the insert 300". In various embodiments, a curvature of the upper surface 401" matches a curvature of the inside surface 212" of the upper housing 210". In various embodiments, a curvature of the lower surface 402" matches a curvature of the outer surface of the pipe 90 which in various embodiments matches a curvature of the outer surface of the pipe 90 around the transverse bore 96. In various embodiments, a curvature of the lower surface 402" matches a curvature of the outer surface of the pipe 90 even when the gasket 400" is in a non-assembled state (i.e., the gasket 400" is formed or molded such that a curvature of the lower surface 402" matches a curvature of the outer surface of the pipe 90 even before assembling the gasket 400" to the pipe 90). In various embodiments, a curvature may be introduced into the gasket 400" during assembly of the gasket 400" to the pipe 90. In various embodiments, the curved shape of the gasket 400" results in a cross-section or profile that varies in shape depending on where the cross-section of the gasket 400" is taken. In various embodiments, the gasket 400" includes ears 430a",b" sized to be received within the ears 230a",b" of the upper housing 210" of the housing 200". In various embodiments, the inclusion of the ears 430a″,b″ prevents the gasket 400″ from rotating out of the correct position about the transverse bore axis 82 with respect to the pipe 90. In various embodiments, the ears 430a″,b″ are sufficiently secured within the ears 230a″,b″ of the upper housing 210″ of the housing 200″—for example, by a tight fit therein—such that the ears 430a″,b″ can also be used to retain the gasket 400″ in the housing 200″. In various embodiments, the ears 230a″,b″ or the ears 430a″,b″ or both may have, for example, a dovetail or cylindrical shape when viewed facing along the transverse bore axis 82.

In various embodiments, the upper housing 210″ and the lower housing 250″ incorporate complementary features which serve to lock the upper housing 210″ with respect to the lower housing 250″, particularly as the mechanical branch outlet 100″ is being assembled and tightened. In various embodiments, the lower housing 250″ includes a tab 270″ proximate the first end 256″. In various embodiments, the tab 270″ is rounded to ease insertion into a groove 240″ defined in the upper housing 210″ proximate the second end 207″. When the mechanical branch outlet 100″ is being assembled and tightened, axial movement of the upper housing 210″ with respect to the lower housing 250″ is resisted by entrapment of the tab 270″ within the groove 240″. The disclosure of one tab 270″ and one groove 240″ in the housing 200″ or their particular locations should not be considered limiting on the current disclosure, however, as in various embodiments a housing such as the housing 200″ may include more than one set or no such feature as a tab 270″ or a groove 240″ at all. In various embodiments when present, the tab 270″ and the groove 240″ need not be rounded and may be of any shape or size at all as long as the tab 270″ fits within the groove 240″.

FIG. 12 shows the mechanical branch outlet 100″ from the front in an assembled state taken along a longitudinal axis 202″ of the pipe bore 204″. An exposed portion 330″ of the insert 300″ is shown with an exposed length 334″ as measured from an uppermost portion of the outer surface 211″ of the upper housing 210″ to the second end 307″ of the insert 300″. The inner surface 212″ of the upper housing 210″ and the inner surface 252″ of the lower housing 250″ of the housing 200″ are shown facing each other to form the pipe bore 204″. In various embodiments, the facing surface 224″ of the upper housing 210″ and the facing surface 254″ of the lower housing 250″ of the housing 200″ also face each other and come into mating contact with each other during assembly and tightening of the mechanical branch outlet 100″. In various embodiments, this is an indication that the mechanical branch outlet 100″ has been sufficiently tightened. In various other embodiments, however, a gap remains between the facing surface 224″ of the upper housing 210″ and the facing surface 254″ of the lower housing 250″ even after sufficient tightening of the mechanical branch outlet 100″. In various embodiments, the first end 306″ of the insert 300″ extends through both an outer surface and an inner surface of the outer wall 98 of the pipe 90 and into the path of a fluid flowing through the pipe system 80″. In various embodiments, by extending through at least an outer surface of the outer wall 98 of the pipe 90, the insert 300″ is prevented from rotating or otherwise shifting out of its original position due to outside forces acting on one or more portions of the assembly. In various embodiments, the first end 306″ can be shorter than shown or curved (to more closely match an inner diameter of the pipe 90)—or both shorter and curved—to diminish obstruction with fluid flow, though in various other embodiments the first end 306″ as shown in FIG. 12 may not obstruct fluid flow to a degree that is undesirable or only obstructs fluid flow at a level that is considered acceptable under the circumstances. In various embodiments, the lower surface 402″ of the gasket 400″ may extend into the bore 204″ of the mechanical branch outlet 100″ before tightening of the branch outlet 100′ about the pipe 90. In various embodiments, this ensures a sufficiently tight seal between the gasket 400″ and the pipe 90.

Figure 13:
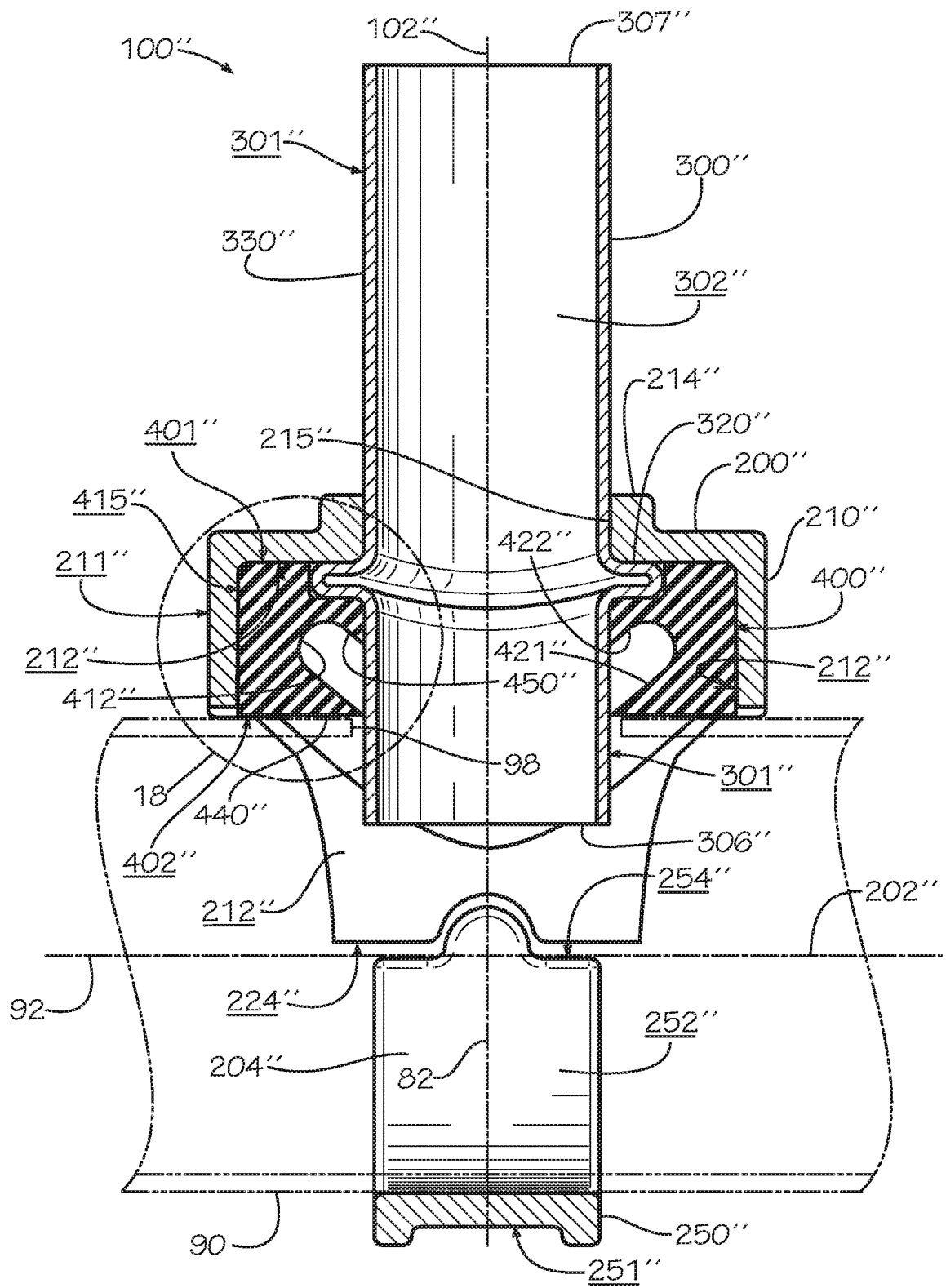
FIG. 13 is a sectional view of the mechanical branch outlet of FIG. 11 taken along line 13-13 of FIG. 12.

FIG. 13 shows the mechanical branch outlet 100″ in cross-section from the side in an assembled state. In various embodiments, a recess 413″ defined in the bore 410″ of the gasket 400″ is sized to receive the rim 320″ of the insert 300″. In various embodiments, a first sealing leg 440″ contacts and seals against an outer surface of the pipe 90 when the mechanical branch outlet 100″ is in an assembled state as shown. In various embodiments, a second sealing leg 450″ contacts and seals against an outer surface 301″ of the insert 300″ when the mechanical branch outlet 100″ is in an assembled state as shown. In various embodiments, the first sealing leg 440″ and the second sealing leg 450″ define a pocket 412″ defined where fluid enters and presses the first sealing leg 440″ and the second sealing leg 450″ against the mating surfaces of the pipe 90 and the insert 300″, respectively. In various embodiments, fluid pressure against a first side 421″ of the pocket 412″ strengthens the seal formed by the first sealing leg 440″ against an outer surface of the pipe 90. In various embodiments, fluid pressure against a second side 422″ of the pocket 412″ strengthens the seal formed by the second sealing leg 450″ against an outer surface 301″ of the insert 300″. In various embodiments, the outer diameter 316″ (shown in FIG. 15) of the first end 306″ of the insert 300″ in a non-assembled state is slightly larger than the inner diameter 404″ (shown in FIG. 18) of the gasket 400″ in a non-assembled state to produce initial compression of the gasket 400 and help ensure a tight seal between the insert 300″ and the gasket 400″. In various embodiments, the outer diameter 316″ of the first end 306″ of the insert 300″ in a non-assembled state is about equal to the inner diameter 404″ of the gasket 400″ in a non-assembled state but features of the gasket 400″ such as the second sealing leg 450″ project, at least in part, radially inward from where the inner diameter 404″ is measured to produce initial compression of the gasket 400″ and help ensure a tight seal between the insert 300″ and the gasket 400″. In various embodiments, each of the first sealing leg 440″, the second sealing leg 450″, and other sealing legs of various embodiments may include various surfaces, tips, and portions and define various angles and other features hereinafter described. The first sealing leg 440″, the second sealing leg 450″, and other sealing legs of various embodiments may alternatively be described as a sealing lip or a seal.

FIGS. 14 and 15 show a side view and a cross-sectional view, respectively, of the insert 300″. In various embodiments, an angle $\theta_5$ of the rim 320″ as measured between a horizontal plane 390″ and an upper surface 322″ of the rim 320″ varies between zero degrees at the front and rear to between zero and 90 degrees at each side. In various embodiments, the angle $\theta_5$ reaches a maximum of approximately 15 to 20 degrees. The disclosure of the angle $\theta_5$ reaching a maximum of between 15 and 20 degrees should not be considered limiting on the current disclosure, however, as the angle $\theta_5$ may reach a maximum value outside of this range depending on the diameter and shape of the pipe 90 to which the mechanical branch outlet 100″ is assembled. In various embodiments, a curvature of the lower surface 321″ matches a curvature of the recess 413″ of the gasket 400″. In various embodiments, the upper surface 322″ and the lower surface 321″ are parallel to one another in cross-section and define a rim thickness T″. In various embodiments, an internal gap G" is substantially equal to the rim thickness T" minus double the thickness of the material forming the material of the rim 320".

In various embodiments, the rim 320" defines a curvature 327" at the radially outward edge of the lower surface 321" and a curvature 328" at the radially outward edge of the upper surface 322" not only at each angular location around the perimeter of the insert 300" but also defines a curvature from a radially inward portion of the rim 320" to a radially outward portion of the rim 320". Therefore, in various embodiments the angle θ5 is an average angle of the upper surface 322" with respect to the horizontal plane 390". In various embodiments, the curvature 328" of the upper surface 322" and the curvature 327" of the lower surface 321" of the rim 320" may vary by an amount equal to a distance between the upper surface 322" and the lower surface 321" of the rim 320". Again, the first end 306" of the insert 300" is shown having the outer diameter 316", and the second end 307" of the insert 300" is shown having the outer diameter 317". In various embodiments, an axially outermost edge of the first end 306" is flat as shown. In various other embodiments, an axially outermost edge of the first end 306" defines a curvature (not shown). In various embodiments, an axially outermost edge of the second end 307" is flat. In various embodiments, an axially outermost portion of the second end 307" is expanded such that the insert 300" is able to receive a portion of a piping system element such as plain-end copper pipe sufficient in length for sweating or brazing to the insert 300". In various embodiments, a portion of the outer surface 301" of the insert 300" proximate the second end 307" defines an annular groove sized to receive a pipe coupling or other connecting element for connecting the insert 300" to a piping system element such as a pipe with a similar annular groove on at least one end.

FIG. 16 shows the gasket 400 of the mechanical branch outlet 100. In various embodiments, the gasket 400 defines the upper surface 401, the lower surface 402, the outer edge surface 415, the bore 410, the inner diameter 404, and the pocket 412 defined between the first sealing leg 440 and the second sealing leg 450. As previously described, the pocket 412 includes the first side 421 and the second side 422. In various embodiments, the inner diameter 404 is defined across radially innermost opposing portions of a bore 410 in a plane perpendicular to an axis of the gasket. In various embodiments, the first sealing leg 440 includes an angled sealing portion 441 defined in the lower surface 402 and a sealing tip 443 located at a radially innermost edge of the lower surface 402. Adjacent the sealing portion 441 is a flat sealing portion 442, which is also defined in the lower surface 402. In various embodiments, the angled sealing portion 441 is angled with respect to the flat sealing portion 442 by an angle 445. The angle 445 in various embodiments helps to provide an initial seal and a tight seal between the gasket 400 and the pipe 90. In various embodiments, the angle 445 is between about 5 and 10 degrees. The disclosure of an angle between about 5 and 10 degrees for the angle 445 should not be considered limiting on the current disclosure, however, as in various embodiments the angle 445 may measure outside this range and may even measure zero degrees. In various embodiments, the entire lower surface 402 is flat with respect to the outer surface of the pipe 90. In various embodiments, the second sealing leg 450 includes a sealing surface 451, an edge relief 452, and a sealing tip 453, where the edge relief 452 and the sealing tip 453 may include a radius or a chamfer in various embodiments. In various embodiments, the angled sealing surface 451 is angled with respect to an axial direction defined by an axis 490 of the gasket 400 by an angle 455. In various embodiments, the angle 455 is between about 5 and 10 degrees. The disclosure of an angle between about 5 and 10 degrees for the angle 455 should not be considered limiting on the current disclosure, however, as in various embodiments the angle 455 may measure outside this range and may even measure zero degrees. In various embodiments, the pocket 412 is angled with respect to the radial direction defined by the gasket 400 by an angle 456. In various embodiments, opposing inner surfaces defined in the sides 421,422 of the pocket 412 are, for example, parallel to one another in cross section. In various embodiments, the pocket 412 allows space for the first sealing leg 440 and the second sealing leg 450 of the gasket 400 to deform during assembly of the mechanical branch outlet to the pipe 90 and provides a fluid pocket to enhance the seal between the gasket 400 and the pipe 90 or the insert 300 as previously described. In various embodiments, the sealing tip 443 is positioned radially outward from the sealing tip 453 by an offset distance 446. In various embodiments, the offset distance 446 is sufficiently large enough so that the first sealing leg 440 does not contact the insert 300 during assembly in such a way as to interfere with the seal created between the first sealing leg 440 and the pipe 90. In various embodiments, the features and functional aspects of the gasket 400—including but not limited to the first sealing leg 440 defining the angle 445 and the second sealing leg 450 defining the angle 455—may be incorporated in respective portions of the gaskets 400',400".

FIG. 17 shows the gasket 400' of the mechanical branch outlet 100'. In various embodiments, the gasket 400' defines the upper surface 401', the lower surface 402', the outer edge surface 415', the bore 410', the inner diameter 404', a pocket 412' between the first sealing leg 440' and the second sealing leg 450', and a recess 413' between the second sealing leg 450' and the third sealing leg 460'. As previously described, the pocket 412' includes the first side 421' and the second side 422'. In various embodiments, the inner diameter 404' is defined across radially innermost opposing portions of a bore 410' in a plane perpendicular to an axis of the gasket. In various embodiments, the first sealing leg 440' includes a sealing tip 443' at a radially innermost edge of the lower surface 402'. In various embodiments, the lower surface 402' extends in a radial direction and matches the outer surface of the pipe 90, though all or portions of the lower surface 402' can be angled with respect to the radial direction in various other embodiments. In various embodiments, the second sealing leg 450' includes a sealing surface 451', an edge relief 452', and a sealing tip 453', where the edge relief 452' and the sealing tip 453' may include a radius or a chamfer in various embodiments. In various embodiments, the sealing surface 451' is parallel to an axial direction defined by an axis 490' of the gasket 400', though the sealing surface 451' may be angled with respect to the axial direction in various other embodiments. In various embodiments, the pocket 412' is angled with respect to the radial direction defined by the gasket 400' by an angle 456'. In various embodiments, opposing inner surfaces defined in the sides 421',422' of the pocket 412' are, for example, parallel to one another in cross section. In various embodiments, the pocket 412' allows space for the first sealing leg 440' and the second sealing leg 450' of the gasket 400' to deform during assembly of the mechanical branch outlet to the pipe 90 and provides a fluid pocket to enhance the seal between the gasket 400' and the pipe 90 or the insert 300' as previously described. In various embodiments, the third sealing leg 460' includes a first rib 462' and a second rib 464'. In various embodiments, the first rib 462' is positioned on an angled surface of the third sealing leg 460' and is configured to contact an upper surface 322' of the rim 320' of the insert 300'. In various embodiments, the second rib 464' is positioned on a vertical surface of the third sealing leg 460' and is configured to contact a vertical portion of the outer surface 301' of the insert 300'.

FIG. 18 shows the gasket 400" of the mechanical branch outlet 100". In various embodiments, the gasket 400" defines the upper surface 401", the lower surface 402", the outer edge surface 415", the bore 410", the inner diameter 404", a pocket 412" between the first sealing leg 440" and the second sealing leg 450", and a recess 413" between the second sealing leg 450' and the upper surface 401". As previously described, the pocket 412" includes the first side 421" and the second side 422". In various embodiments, the inner diameter 404" is defined across radially innermost opposing portions of a bore 410" in a plane perpendicular to an axis of the gasket. In various embodiments, the first sealing leg 440" includes a sealing tip 443" at a radially innermost edge of the lower surface 402". In various embodiments, the lower surface 402" extends in a radial direction and matches the outer surface of the pipe 90, though all or portions of the lower surface 402" can be angled with respect to the radial direction in various other embodiments. In various embodiments, the second sealing leg 450" includes a sealing surface 451", an edge relief 452", and a sealing tip 453", where the edge relief 452" and the sealing tip 453" may include a radius or a chamfer in various embodiments. In various embodiments, the sealing surface 451" is parallel to an axial direction defined by an axis 490" of the gasket 400", though the sealing surface 451" may be angled with respect to the axial direction in various other embodiments. In various embodiments, the pocket 412" is angled with respect to the radial direction defined by the gasket 400" by an angle 456". In various embodiments, opposing inner surfaces defined in the sides 421",422" of the pocket 412" are, for example, parallel to one another in cross section. In various embodiments, the pocket 412" allows space for the first sealing leg 440" and the second sealing leg 450" of the gasket 400" to deform during assembly of the mechanical branch outlet to the pipe 90 and provides a fluid pocket to enhance the seal between the gasket 400" and the pipe 90 or the insert 300" as previously described. In various embodiments, the recess 413" is sized to receive the rim 320" of the insert 300".

Figure 19:
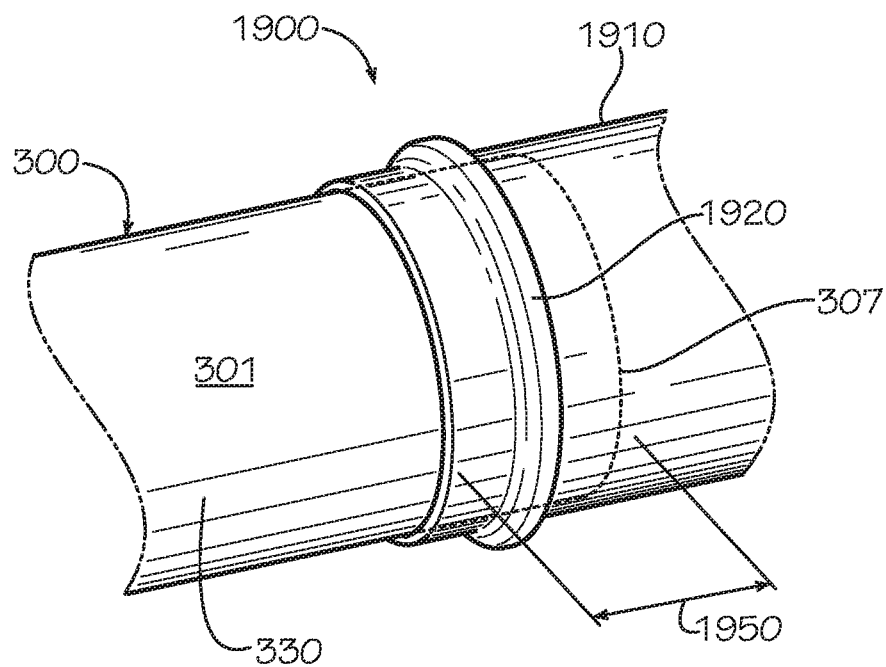
FIG. 19 is a perspective view of a crimped joint connecting the insert of FIG. 4 with a piping system element in accordance with one embodiment of the current disclosure.

FIG. 19 shows a crimped joint 1900 connecting the insert 300 to a piping system element 1910. In various embodiments, the piping system element 1910—which can be a coupling, a section of pipe, an elbow, a tee, an adapter, a cap, a union, a reducer, or any one of a number of various crimp fittings—is assembled to an insert such as the insert 300. In various embodiments, the end 307 of the exposed portion 330 of the insert 300 is inserted into the piping system element 1910 far enough to enable a securing element 1920 to be engaged with the insert 300. In various embodiments, engaging the securing element 1920 with the insert 300 includes a mechanical crimping, squeezing, or pressing of the crimped joint 1900 such that the piping system element 1910 and the insert 300 are mechanically locked together. In various embodiments, the securing element 1920 of the piping system element 1910 includes an annular elastomeric seal (not shown) such as an O-ring that additionally forms a seal between the piping system element 1910 and the insert 300 as the piping system element 1910 is connected to the insert 300.

In various embodiments of a mechanical branch outlet such as the mechanical branch outlet 100, a rim of an insert such as the rim 320 of the insert 300 retains the first end 306 of the insert 300 inside the housing 200. In various embodiments, an outer diameter of a rim such as the outer diameter 324 of the rim 320 is greater than an outer diameter 316 of the first end 306 of the insert 300. In various embodiments, an insert such as the insert 300 extends through the outlet bore 215 of the upper housing 210 of the housing 200, an exposed portion 330 of the insert sufficient in length and having a plain end allowing it to be crimped to a piping system element. In various embodiments, a minimum insertion length such as the insertion length 1950 for crimping or otherwise engaging a mechanically locked joint is greater than the exposed length 334 of the insert 300.

In various embodiments of a pipe system such as the pipe system 80, the insert 300 extends from the pipe 90 at an angle to a longitudinal axis 202 of the pipe 90 that is substantially equal to 90 degrees. In various embodiments, a fluid (not shown) inside the pipe 90 is not able to come in contact with the housing 200 when the pipe system 80 is in an assembled state. Rather, the insert 300 and the gasket 400 contact the fluid instead. In various embodiments, a mechanical branch outlet such as the mechanical branch outlet 100, a crimped joint such as the crimped joint 1900, a crimp fitting such as that represented by the piping system element 1910, and a pipe system such as the pipe system 80 all comply with NSF-61 specifications for drinking water system components. In various embodiments, all surfaces of the mechanical branch outlet 100 exposed to a fluid inside the pipe system 80 when the mechanical branch outlet 100 is assembled to the pipe system 80 are formed from a lead-free material.

Some materials—brass or bronze, for example—are acceptable to use in such pipe systems as the pipe system 80 where the material is in direct contact with the fluid in the pipe system 80. Such materials if used to form a housing such as the upper housing 210 of the housing 200, however, can fail mechanically during installation or during use because such materials are often more brittle than materials that are not as safe but are sufficiently ductile to handle the loads experienced during installation and use. In addition, when a material such as bronze or brass is used in a pipe system such as the pipe system 80, copper tubing or tubing of another material is typically "sweated" or brazed in or an adapter fitting is typically sweated to the tubing by applying heat to the connection and placing solder inside the connection. The bronze or brass housing and adapter fitting are both threaded to receive the sweated or brazed fitting including the copper tubing or copper tubing stub. Incorporating sweating and threaded operations into a connection may increase the cost and complexity of the connection, however. They may also require that an individual installing the fitting possess certain tools and materials—a heat source such as a propane torch and solder—and certain skills—the ability to properly prepare and solder by hand a completely leak-proof joint and the ability to probably thread and tighten to the proper torque any adapter fittings that are used—that would not otherwise be required.

In various embodiments, components of a housing such as the upper housing 210 and the lower housing 250 of the housing 200 are cast from ductile iron. In various embodiments, the ductile iron used meets ASTM A536 specifications for a grade 65-45-12 and does not require additional heat treatment after casting. In various embodiments, the ductile iron used is able to withstand the structural loads experienced during assembling and tightening of a mechanical branch outlet such as the mechanical branch outlet 100. The disclosure of ductile iron should not be considered limiting on the present disclosure, however, as in various other embodiments one or more components of the housing 200 may be made from brass, bronze, plastic, or any other sufficiently strong material. The disclosure of a casting process should also not be considered limiting on the present disclosure, as in various other embodiments one or more components of the housing 200 may be injection-molded, machined, or formed using another appropriate forming method known to one of ordinary skill in the art. In various embodiments, the fastener torque, which can be specified by ANSI for this kind of installation, can be within a range of 30-40 foot-pounds for a U-bolt; within a range of 60-80 foot-pounds for a ½" bolt; within a range of 100-130 foot-pounds for a ⅝" bolt; and within a range of 130-180 foot-pounds for a ¾" bolt. The disclosure of fastener torque range should not be considered limiting on the current disclosure, however, as in various embodiments an acceptable torque range is outside of these ranges. In various embodiments, the bolt size used is outside of those disclosed herein. In various embodiments, the upper housing 210 and the lower housing 250 include a copper-colored alkyd enamel coating. Disclosure of a copper-colored alkyd enamel coating should not be considered limiting on the current disclosure, however, as in various embodiments the housing is coated with any one of a number of other coatings including, but not limited to, a hot-dipped galvanized coating.

In various embodiments, a bolt such as included in the fasteners used to assemble a mechanical branch outlet such as the mechanical branch outlet 100 is an oval-neck track head bolt. In various embodiments, such a bolt is a heat-treated, zinc-electroplated bolt made of carbon steel. In various embodiments, the bolt has mechanical properties meeting ASTM A183 Grade 2 or ASTM A449 specifications. In various embodiments, a nut such as included in the fasteners used to assemble a mechanical branch outlet such as the mechanical branch outlet 100 has mechanical properties meeting ASTM A563 Grade A or Grade B, 1995 Grade 2, or ISO 898-1 Class 8.8 specifications. In various embodiments, the bolt or the nut or the fastener that is otherwise utilized is formed from 304 series or 316 series stainless steel or another appropriate grade known to one of ordinary skill in the art.

In various embodiments, an insert such as the insert 300 is formed from copper. In various embodiments, the copper from which the insert 300 is formed is a type K or a type L copper meeting ASTM B88 specifications. Disclosure of a copper formed is a type K or a type L copper meeting ASTM B88 specifications, however, should not be considered limiting on the current disclosure. In various embodiments, a rim such as the rim 320 is formed from and integral with the material of the insert 300. In various embodiments, the insert 300 is formed at least in part from another metallic material such as stainless steel or aluminum or from a non-metallic material such as polyvinyl chloride (PVC), chlorinated polyvinyl chloride (CPVC), high-density polyethylene (HDPE), or another plastic material. The disclosure of copper, stainless steel, aluminum, PVC, CPVC, HDPE, and other plastic materials should not be considered limiting on the current disclosure, however, as in various other embodiments other materials may be used depending on the characteristics of the system and the pressure rating required. In various embodiments, the insert 300 is molded using an injection-molding or similar process. In various embodiments, at least one of an insert such as the insert 300 and a housing such as the housing 200 includes a dielectric coating or a non-conductive sleeve to electrically isolate the insert from the housing.

In various embodiments, a rim of an insert such as the rim 320 of the insert 300 is formed integrally with the first end 306 and the second end 307 of the insert 300 by rolling one end of a section of pipe (not shown) back over itself in such a way that the rim 320 is formed between the first end 306 and the second end 307 of the insert 300. In various embodiments, tooling presses or otherwise forms the rim 320 into a flange shape that matches the contour of various surfaces of the pipe 90, the housing 200, and the gasket 400. In various embodiments, a rim of an insert such as the rim 320' of the insert 300' is formed by placing a section of pipe (not shown) into a die (not shown), heating the section of pipe, and pressuring the inside of the pipe in such a way that a portion of the pipe between the first end 306' and the second end 307' of the insert 300' is deformed to match the shape of the die. In various embodiments, the shape of the die matches the desired shape of the rim 320' such that the shape of the rim 320' matches the contour of various surfaces of the pipe 90, the housing 200', and the gasket 400'. In various embodiments, the section of pipe forming the insert 300' is separately formed by any one or more of a variety of mechanical forming processes before or after the section of pipe is heated and blown into a die. In various embodiments, a rim of an insert such as the rim 320" of the insert 300" is formed by placing a section of pipe (not shown) into a die (not shown), heating the section of pipe, and pressuring the inside of the pipe in such a way that a portion of the pipe between the first end 306" and the second end 307" of the insert 300" is deformed to match the shape of the die. In various embodiments, the material surround the rim 320" is processed further to adjust the thickness T" of the rim 320" or the gap G" inside the upper surface 322" and the lower surface 321" of the rim 320". In various embodiments, the shape of the die matches the desired shape of the rim 320" such that the shape of the rim 320" matches the contour of various surfaces of the pipe 90, the housing 200", and the gasket 400".

In various embodiments, a rim such as any of the rims 320,320',320" may be formed separately to mimic the geometry disclosed and then brazed or otherwise secured to an insert not formed with such a rim. In various embodiments, a separately-formed rim may be formed from a material other than copper and may be secured to the pipe by a method other than brazing. In various embodiments, a rim such as any of the rims 320,320',320" shown protruding beyond an outer diameter of an insert such as the outer diameter 317 may instead by formed as a reverse flange or reverse rim. In various embodiments, forming a reverse flange or a reverse rim in an insert includes forming the insert such that an annular indentation is defined in an outer surface of the insert. In various embodiments, the curvature of such a rim may be made to follow the curvature of an outer surface of the pipe 90. A housing, or portions thereof, may be configured to lock into the reverse flange or reverse rim in order to retain the insert in the housing.

In various embodiments, a gasket such as the gasket 400 is made from an elastomeric material. In various embodiments, the gasket 400 is made from an EPDM material meeting the Grade E designation of ASTM D2000, which is typically suited for water service, diluted acids, alkalies solutions, oil-free air, and many other chemical services in temperatures ranging from as low as −40 degrees Fahrenheit to as high as 250 degrees Fahrenheit. In various embodiments, the gasket 400 is made from a nitrile rubber material meeting the Grade T designation of ASTM D2000, which is suited for petroleum, air with oil vapors, and vegetable and mineral oils in temperatures ranging from as low as −20 degrees Fahrenheit to as high as 180 degrees Fahrenheit. The disclosure of specific materials, types of service, and temperature ranges for the gasket 400 should not be considered limiting on the current disclosure, however, as in various embodiments the gasket material, type of service, or temperature falls outside of these ranges or specifications. In various embodiments, the gasket or another portion of the mechanical branch outlet 100 is lubricated or is installed with the aid of a lubricant.

In various embodiments, a gasket such as the gasket 400 is molded to or adhesively attached to an insert such as the insert 300. In various embodiments, the insert 300 and the gasket 400 can be molded together in the same operation using an overmolding process wherein the gasket is molded in-place on the outside surface 301 of the insert 300. In various embodiments, a rim such as the rim 320 of the insert 300 causes the copper insert to be retained securely within the housing 200 of the mechanical branch outlet even when subjected to the high pressures experienced inside a pipe system such as the pipe system 80. In various embodiments, entrapment of the rim 320 inside the housing 200 results from the outer diameter 324 of the rim 320 being smaller than an inner diameter of the bore 215 of the housing 200. In various embodiments, a rim such as the rim 320 is in contact with both the housing 200 and the gasket 400. In various embodiments, a rim such as the rim 320 is in contact with only the gasket 400. In various embodiments, a rim such as the rim 320 is in contact with the pipe 90. In various embodiments, an insert such as the insert 300 is isolated from the housing 200. This is accomplished by capturing or entrapping a rim such as the rim 320' inside the gasket 400' and enlarging the bore 215' of the upper housing 210' so that a gap (not shown) is created between the insert 300' and the upper housing 210'. In various embodiments, the height of a gasket such as the gasket 400 as measured along a vertical axis such as the vertical axis 102 is sized to support the insert 300 such that direct contact between the insert 300 and the housing 200 is not necessary. In various embodiments, a gasket such as the gasket 400 incorporates additional seals or ribs to seal against the insert 300 or the pipe 90 in additional locations. In various embodiments, a gasket such as the gasket 400 defines a lower surface 402 having a cylindrical contour or shape that is substantially coaxial with a longitudinal axis 202 of the mechanical branch outlet 100. In various embodiments, a rim such as the rim 320 of the insert 300 has a cylindrical contour or shape that is substantially coaxial with a longitudinal axis 202 of the mechanical branch outlet 100.

In various embodiments, a housing such as that resulting from a pair of upper housings 210 are secured about a pipe 90 together with a pair of gaskets 400 and a pair of inserts 300. A resulting mechanical branch outlet (not shown) will thus have two outlets and can be described as a cross-tee outlet or a cross connection with an exposed portion 330 of each insert 300 attachable to additional piping system elements such as the piping system element 1910.

In various embodiments, a method for assembling one of the mechanical branch outlets 100,100',100" includes preparing the pipe 90 by drilling, cutting, or otherwise forming the transverse bore 96 in the pipe 90 along the transverse bore axis 82, positioning the first end 306,306',306" of the insert 300,300',300" into the transverse opening 96 in the pipe 90; and assembling the housing 200,200',200" to the pipe 90 such that a fluid (not shown) inside the pipe 90 is prevented from contacting the housing 200,200',200" when the mechanical branch outlet 100,100',100" is assembled to the pipe 90. In other words, the mechanical branch outlet 100,100',100" is isolated from a fluid path defined through the pipe 90 and through the insert 300,300',300" when the pipe system 80,80',80" is in an assembled state.

In various embodiments of the method, the insert 300, 300',300" extends from the pipe 90 at an angle to the longitudinal axis 92 of the pipe 90 that is substantially equal to 90 degrees. In various embodiments of the method, the pipe 90 is a first pipe 90, the method further comprising connecting a piping system element 1910 to the insert 300,300',300" with a crimp fitting. In various embodiments, the piping system element 1910 is itself a crimp fitting. In various embodiments, the method further includes assembling the gasket 400,400',400" to the pipe 90 between the upper housing 210,210',210" of the housing 200,200',200" and the pipe 90.

In various embodiments of the method, assembling the gasket 400,400',400" to the pipe 90 includes contacting a first sealing leg 440,440',440" of the gasket 400,400',400" with an outer surface of the pipe 90. In various embodiments of the method, assembling the gasket 400,400',400" to the pipe 90 includes contacting a second sealing leg 450,450', 450" of the gasket 400,400',400" with an outer surface 301,301',301" of the insert 300,300',300" of the mechanical branch outlet 100,100',100".

For purposes of the current disclosure, a measurement measuring about X or substantially X on a measurement scale measures within a range between X plus an industry-standard upper tolerance for the specified measurement and X minus an industry-standard lower tolerance for the specified measurement. Because tolerances can vary between different components and between different models of mechanical branch outlets such as the mechanical branch outlets 100,100',100", the tolerance for a particular measurement of a particular component of a particular mechanical branch outlet can fall within a range of tolerances.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the That which is claimed is:

1. A mechanical branch outlet comprising:
a housing having an outer surface and an inner surface and defining an outlet bore extending between the outer surface and the inner surface; and
an insert having a first end and a second end, the insert defining an axis aligned with the outlet bore of the housing, the outlet bore of the housing sized to receive the second end of the insert and retain the first end of the insert, the insert comprising a rim positioned between the first end and the second end of the insert, a surface of the rim angled with respect to the axis of the insert, an outer diameter of the rim greater than each of the outlet bore of the housing and an outer diameter of the first end of the insert; and
a gasket defining an inner diameter, the inner diameter sized to receive the first end of the insert, the gasket of the mechanical branch outlet comprising a first sealing leg and a second sealing leg, the first sealing leg positioned to contact a pipe when the housing is installed on the pipe, the second sealing leg and a bore of the gasket defined thereby contacting the insert, the gasket further defining a recess in the bore, the bore sized to receive the rim, the rim positioned between and in contact with each of the second sealing leg of the gasket and an inner surface of the housing.

2. The mechanical branch outlet of claim 1, wherein the gasket defines a lower surface, the lower surface having a cylindrical contour.

3. The mechanical branch outlet of claim 2, wherein the cylindrical contour of the lower surface of the gasket is substantially coaxial with a longitudinal axis of the mechanical branch outlet.

4. The mechanical branch outlet of claim 3, wherein the rim of the insert also has a cylindrical contour.

5. The mechanical branch outlet of claim 4, wherein the cylindrical contour of the rim is substantially coaxial with the longitudinal axis of the mechanical branch outlet.

6. The mechanical branch outlet of claim 1, wherein the housing is an upper housing and includes ductile iron.

7. The mechanical branch outlet of claim 1, wherein the rim is sized to retain a first end of the insert inside the housing, the rim being integral with the material of the insert.

8. The mechanical branch outlet of claim 7, wherein:
the recess is defined between the second sealing leg and an upper surface of the gasket, the upper surface of the gasket in contact with the housing.

9. The mechanical branch outlet of claim 1, wherein the gasket defines a pocket between the first sealing leg and the second sealing leg, the pocket facing radially inward and angularly away from the housing and configured to strengthen the seal formed by the first sealing leg against the pipe.

10. A pipe system comprising the mechanical branch outlet of claim 1, the pipe system further comprising
a pipe, the pipe defining a transverse bore in an outer wall of the pipe sized to receive the first end of the insert, the mechanical branch outlet being assembled to the pipe.

11. The pipe system of claim 10, wherein the insert extends from the pipe at an angle to a longitudinal axis of the pipe that is substantially equal to 90 degrees.

12. The pipe system of claim 10, wherein a curvature of the gasket and a curvature of an outer diameter of the pipe share a common axis when the gasket is in a non-assembled state.

13. The pipe system of claim 10, wherein the housing is isolated from a fluid path defined through the pipe and through the insert when the pipe system is in an assembled state.

14. The pipe system of claim 10, wherein the gasket defines a recess between the second sealing leg and an upper surface of the gasket, the upper surface of the gasket in contact with the housing.

15. The pipe system of claim 10, wherein the first end of the insert extends through the transverse bore defined in the outer wall of the pipe.

16. The pipe system of claim 10, wherein the insert extends through the outlet bore of the housing, the pipe system further comprising a piping system element having a crimped joint crimped to an exposed portion of the insert.

17. A method for assembling the mechanical branch outlet of claim 1 to a pipe, the method comprising:
positioning the first end of the insert of the mechanical branch outlet into a transverse bore defined in an outer wall of the pipe; and
assembling the housing of the mechanical branch outlet to the pipe, the housing being isolated from a fluid path defined through the pipe and through the insert when the pipe system is in an assembled state.

18. The method of claim 17, wherein the pipe is a first pipe, the method further comprising connecting a piping system element to the insert, the piping system element being a crimp fitting.

19. The method of claim 17, further comprising:
assembling the gasket to the pipe between the housing and the pipe by contacting the first sealing leg of the gasket with an outer surface of the pipe;
contacting the second sealing leg of the gasket with an outer surface of the insert of the mechanical branch outlet; and
inserting the rim of the insert into the recess of the gasket, the recess defined between the second sealing leg and an upper surface of the gasket, an outer diameter of the rim being greater than an outer diameter of a second end of the insert, the second end of the insert distal from the first end of the insert; and
contacting the housing with each of the upper surface of the gasket and the rim of the insert.

* * * * *